United States Patent
Choi et al.

(10) Patent No.: US 11,079,162 B2
(45) Date of Patent: Aug. 3, 2021

(54) REFRIGERATOR

(71) Applicant: LG Electronics Inc., Seoul (KR)

(72) Inventors: Sangbok Choi, Seoul (KR); Yonghwan Eom, Seoul (KR); Kyongbae Park, Seoul (KR); Juyeong Heo, Seoul (KR); Cholok Han, Seoul (KR); Sungwook Kim, Seoul (KR); Wookyung Baik, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/072,342

(22) PCT Filed: Jan. 25, 2017

(86) PCT No.: PCT/KR2017/000861
§ 371 (c)(1),
(2) Date: Jul. 24, 2018

(87) PCT Pub. No.: WO2017/131426
PCT Pub. Date: Aug. 3, 2017

(65) Prior Publication Data
US 2019/0072310 A1    Mar. 7, 2019

(30) Foreign Application Priority Data

Jan. 29, 2016 (KR) .................. 10-2016-0011109
Jan. 29, 2016 (KR) .................. 10-2016-0011110
(Continued)

(51) Int. Cl.
*F25D 21/02* (2006.01)
*F25B 49/02* (2006.01)
(Continued)

(52) U.S. Cl.
CPC ............ *F25D 21/025* (2013.01); *F25B 49/02* (2013.01); *F25D 17/08* (2013.01); *F25D 21/006* (2013.01);
(Continued)

(58) Field of Classification Search
CPC ...... G01F 1/42; G01F 1/44; G01F 1/46; G01F 1/37; G01F 1/372; G01F 1/34;
(Continued)

(56) References Cited

U.S. PATENT DOCUMENTS 4,481,828 A * 11/1984 Cheng ..................... G01F 1/36
73/861.63
2005/0279122 A1* 12/2005 Cohen ..................... F25D 11/00
62/441
(Continued)

FOREIGN PATENT DOCUMENTS

CN    1798947 A    7/2006
JP    10-253410    9/1998
(Continued)

OTHER PUBLICATIONS

First Office Action in Chinese Appln. No. 201780019994.3, dated Apr. 8, 2020, 13 pages (with English translation).
(Continued)

*Primary Examiner* — Marc E Norman
*Assistant Examiner* — Schyler S Sanks
(74) *Attorney, Agent, or Firm* — Fish & Richardson P.C.

(57) ABSTRACT

The present invention provides a refrigerator comprising: a cabinet having a storage chamber; a door for opening or closing the storage chamber; a case in which an inlet through which air flows from the storage chamber and an outlet through which the air is discharged to the storage chamber are formed; an evaporator provided inside the case for
(Continued)

exchanging heat with the air to supply cool air; and a differential pressure sensor provided inside the case.

20 Claims, 36 Drawing Sheets

(30) Foreign Application Priority Data

Jan. 29, 2016 (KR) .......................... 10-2016-0011111
Feb. 18, 2016 (KR) .......................... 10-2016-0019276
Jul. 29, 2016 (KR) .......................... 10-2016-0096676

(51) Int. Cl.
*F25D 21/00* (2006.01)
*G01L 27/00* (2006.01)
*F25D 17/08* (2006.01)

(52) U.S. Cl.
CPC ...... *G01L 27/007* (2013.01); *F25B 2700/197* (2013.01); *F25B 2700/21175* (2013.01); *F25D 2317/063* (2013.01); *F25D 2317/0672* (2013.01); *F25D 2700/121* (2013.01)

(58) Field of Classification Search
CPC ...... F25D 21/025; F25D 21/006; F25D 17/08; F25B 2700/2117; F25B 2700/21174; F25B 2700/21175; F25B 2700/11; F25B 2700/02; F25B 2347/02
See application file for complete search history.

(56) References Cited

U.S. PATENT DOCUMENTS

| | | | | |
|---|---|---|---|---|
| 2007/0256506 A1* | 11/2007 | Sette | ........................ | G01F 1/46 73/861.42 |
| 2013/0042638 A1* | 2/2013 | Eom | ...................... | F25D 21/02 62/80 |
| 2013/0081416 A1* | 4/2013 | Kim | ...................... | F25D 21/006 62/151 |

FOREIGN PATENT DOCUMENTS

| | | | | |
|---|---|---|---|---|
| KR | 940011916 | | 6/1994 | |
| KR | 1019920021110 B1 * | | 2/1997 | ............ F25D 21/08 |
| KR | 10-0120536 | | 10/1997 | |
| KR | 10-0238060 | | 1/2000 | |
| KR | 10-2004-0094875 | | 11/2004 | |
| KR | 100652775 | | 12/2006 | |
| KR | 1020100058813 | | 6/2010 | |
| KR | 101414138 | | 7/2014 | |
| KR | 10-1463041 | | 11/2014 | |

OTHER PUBLICATIONS

Korean Office Action in Korean Application No. 10-2018-7024802, dated Dec. 21, 2020, 15 pages (with English translation).
KR Notice of Allowance in Korean Appln. No. 10-2018-7024802, dated Mar. 8, 2021, 7 pages (with English translation).

* cited by examiner (a)  (b)

(c)

SECTION A

SECTION B

SECTION C (a) (b)

(c)

SECTION A

SECTION B

SECTION C

REFRIGERATOR

CROSS-REFERENCE TO RELATED APPLICATIONS

This application is a National Stage application under 35 U.S.C. § 371 of International Application No. PCT/KR2017/000861, filed on Jan. 25, 2017, which claims the benefit of Korean Application No. 10-2016-0096676, filed on Jul. 29, 2016, Korean Application No. 10-2016-0019276, filed on Feb. 18, 2016, Korean Application No. 10-2016-0011111, filed on Jan. 29, 2016, Korean Application No. 10-2016-0011110, filed on Jan. 29, 2016, and Korean Application No. 10-2016-0011109, filed on Jan. 29, 2016. The disclosures of the prior applications are incorporated by reference in their entirety.

TECHNICAL FIELD

The present invention relates to a refrigerator, and more particularly to a refrigerator having improved energy efficiency.

In addition, the present invention relates to a differential pressure sensor and a refrigerator including the same, and more particularly to a differential pressure sensor capable of using a differential pressure and a refrigerator including the same.

BACKGROUND ART

In general, a refrigerator includes a machinery compartment, which is located at the lower part of a main body of the refrigerator. The refrigerator is generally installed at the lower part of the refrigerator in consideration of the center of gravity of the refrigerator and in order to improve assembly efficiency and to achieve vibration reduction.

A refrigeration cycle device is installed in the machinery compartment of the refrigerator in order to keep the interior of the refrigerator frozen/refrigerated using the property of a refrigerant, which absorbs external heat when a low-pressure liquid refrigerant is changed to a gaseous refrigerant, whereby food is kept fresh.

The refrigeration cycle device of the refrigerator includes a compressor for changing a low-temperature, low-pressure gaseous refrigerant to a high-temperature, high-pressure gaseous refrigerant, a condenser for changing the high-temperature, high-pressure gaseous refrigerant, changed by the compressor, to a low-temperature, low-pressure liquid refrigerant, and an evaporator for changing the low-temperature, high-pressure liquid refrigerant, changed by the condenser, to a gaseous refrigerant in order to absorb external heat.

When the compressor is driven, the temperature of the evaporator is lowered, whereby ice may be formed on the evaporator. In the case in which the amount of ice formed on the evaporator increases, the efficiency of heat exchange between the evaporator and air is lowered, whereby it is difficult to smoothly cool air to be supplied to a storage compartment. As a result, it is necessary to drive the compressor a larger number of times and for a larger amount of time.

In addition, when ice is formed on the evaporator, a heater is driven in order to remove the ice from the evaporator. In the case in which the heater is unnecessarily frequently driven, the amount of power consumed by the refrigerator increases.

In particular, power consumption of refrigerators produced in recent years has increased as the result of an increase in the storage capacity of the refrigerators. Research has thus been conducted into the reduction of power consumption.

DISCLOSURE

Technical Problem

One object of the present invention devised to solve the problem lies in a refrigerator having improved energy efficiency.

Another object of the present invention devised to solve the problem lies in a refrigerator capable of determining whether the operation of the refrigerator is performed normally.

Another object of the present invention devised to solve the problem lies in a refrigerator capable of determining a defrosting time using a sensor.

Another object of the present invention devised to solve the problem lies in a refrigerator capable of determining whether a defrosting operation is performed normally using a sensor.

Another object of the present invention devised to solve the problem lies in a refrigerator capable of determining whether a sensor has broken down using a sensor.

Another object of the present invention devised to solve the problem lies in a refrigerator capable of preventing a differential pressure sensor from breaking down due to dew formed thereon.

Another object of the present invention devised to solve the problem lies in a refrigerator capable of improving the accuracy of measurement when a differential pressure sensor is used.

Another object of the present invention devised to solve the problem lies in a differential pressure sensor assembly capable of sensing whether frost is formed on an evaporator using a differential pressure sensor and a refrigerator including the same.

A further object of the present invention devised to solve the problem lies in a differential pressure sensor assembly capable of stably installing a differential pressure sensor and a refrigerator including the same.

Technical Solution

The objects of the present invention can be achieved by providing a refrigerator including a cabinet having a storage compartment defined therein, a door for opening and closing the storage compartment, a case having therein an inlet, through which air is introduced from the storage compartment, and an outlet, through which air is discharged to the storage compartment, an evaporator provided in the case for exchanging heat with air to supply cool air, and a differential pressure sensor provided in the case, wherein the differential pressure sensor includes a first pipe having therein a first through-hole disposed between the evaporator and the inlet, a second pipe having therein a second through-hole disposed between the evaporator and the outlet, and a connection member for interconnecting the first pipe and the second pipe, and wherein the differential pressure sensor senses a difference in pressure between the first through-hole and the second through-hole.

The outlet may be disposed higher than the evaporator, and the inlet may be disposed lower than the evaporator.

The connection member may include an electronic circuit for sensing the difference in pressure.

The connection member may be disposed higher than the evaporator.

The first pipe and the second pipe may extend above the evaporator.

The first pipe or the second pipe may be formed to have a hollow shape, and the hollow shape may have a circular section.

The refrigerator may further include a fan provided in the case for generating the flow of air that is introduced through the inlet and discharged through the outlet, wherein the connection member may be disposed higher than the fan.

The first through-hole and the second through-hole may be disposed so as to face downwards.

The first pipe or the second pipe may be provided with a plurality of communication holes, and the communication holes may be disposed so as to be perpendicular to the first through-hole or the second through-hole.

The first pipe or the second pipe may be provided at one end thereof with a first expanded pipe part, the diameter of which gradually increases toward the end thereof.

The first through-hole or the second through-hole may be provided in the lower part of the first expanded pipe part, and may be formed in the side surface of the first pipe or the second pipe.

The first expanded pipe part may be provided at the lower part thereof with a second expanded pipe part, the diameter of which gradually increases toward the end thereof.

A hole, through which air is guided so as to move upwards, may not be formed in the lower part of the second expanded pipe part.

The lower end of the second expanded pipe part may extend so as to have a larger sectional area than the lower end of the first expanded pipe part.

The section of the portion of the first pipe or the second pipe that is coupled to the connection member may be smaller than the section of the portion of the first pipe or the second pipe in which the first through-hole or the second through-hole is formed.

The refrigerator may further include a heater provided in the case and a controller for performing control to drive the heater based on information sensed by the differential pressure sensor in order to defrost the evaporator.

The refrigerator may further include a door switch for sensing whether the door opens and closes the storage compartment, wherein the controller may perform control such that the differential pressure sensor senses the difference in pressure when the door switch senses that the door to the storage compartment is closed.

The refrigerator may further include a fan for generating the flow of air that is introduced through the inlet and discharged through the outlet, wherein the controller may perform control such that the differential pressure sensor senses the difference in pressure when the fan is driven.

The refrigerator may further include an evaporator temperature sensor for measuring the temperature of the evaporator, wherein the controller may perform control to stop driving the heater in the case in which the temperature of the evaporator increases to a set temperature when defrosting is performed.

Advantageous Effects

According to the present invention, information necessary for a refrigerator is acquired using a single sensor. Consequently, it is possible to reduce measurement errors compared to the case in which two or more sensors are used. If two values are compared using two sensors, different effects may occur due to temperature or warm current at positions at which the sensors are installed or due to opening and closing of a door, whereby different errors may occur at the two sensors. When the values acquired using the two sensors are compared, therefore, error may be increased compared to the case in which a single sensor is used.

In addition, according to the present invention, it is possible to reduce power consumption and the amount of required resources, such as electrical wires, for installing two sensors compared to the case in which the two pressure sensors are used.

In addition, according to the present invention, measurement is periodically performed using a sensor, whereby it is possible to reduce energy consumption.

In addition, according to the present invention, the finishing of defrosting is determined based on information measured by an evaporator temperature sensor, whereby it is possible to secure reliability in determining the finishing of defrosting. Furthermore, according to the present invention, defrosting is finished based on the temperature sensed by the evaporator temperature sensor, whereby it is possible to reduce the number of times that a heater is driven to defrost an evaporator and thus to reduce actual power consumption.

According to the present invention, it is possible to determine whether defrosting has failed, whereby it is possible to prevent the power consumption of the refrigerator from increasing.

In addition, according to the present invention, it is possible to sense clogging of a differential pressure sensor, whereby it is possible to prevent poor defrosting due to the breakdown of the differential pressure sensor.

In addition, according to the present invention, it is possible to determine the breakdown of the differential pressure sensor using the differential pressure sensor without using any additional sensor, whereby it is not necessary to provide an additional sensor.

In addition, according to the present invention, the possibility of dew being formed on the differential pressure sensor is reduced, whereby it is possible to reduce an error in the values measured by the differential pressure sensor.

According to the present invention, frost formed on the evaporator is sensed using the differential pressure sensor, which measures a difference in pressure, whereby it is possible to improve accuracy in determining whether frost is formed on the evaporator.

In addition, according to the present invention, it is possible to easily install the differential pressure sensor.

In addition, according to the present invention, the structure in which the differential pressure sensor is installed is reduced, whereby it is possible to reduce the amount of frost formed in a housing, in which the differential pressure sensor is accommodated, due to cool air that has passed through the evaporator. Furthermore, the resistance applied to the differential pressure sensor is reduced when cool air is supplied, whereby it is possible to smoothly supply cool air to a storage compartment.

In addition, according to the present invention, the structure of the housing is simplified and the size of the housing is reduced, whereby it is possible to reduce the cost of manufacturing the housing.

In addition, according to the present invention, it is possible to reduce the amount of a molding solution that is used to fill a space defined in the housing, since the size of the housing is reduced.

In addition, according to the present invention, air introduced through a communication pipe moves to the differential pressure sensor while only a small amount of resistance is applied to the air, whereby it is possible to improve measurement accuracy.

BEST MODE

Figure 1:
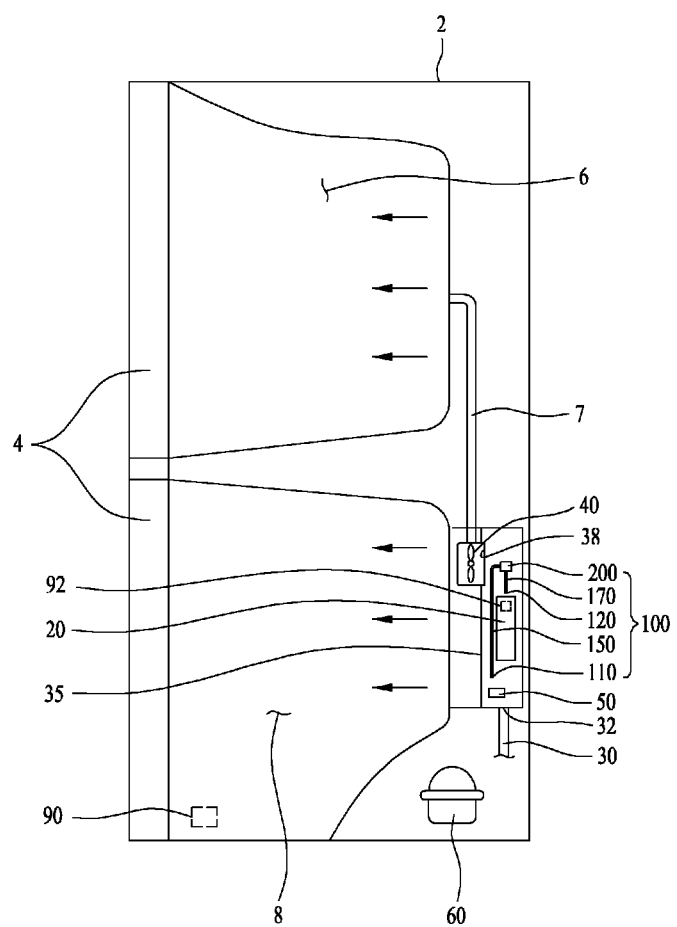
FIG. 1 is a side cut-away view showing a refrigerator according to an embodiment of the present invention.

Reference will now be made in detail to the preferred embodiments of the present invention, examples of which are illustrated in the accompanying drawings.

In the drawings, sizes and shapes of elements may be exaggerated for convenience and clarity of description. In addition, terms specially defined in consideration of the construction and operation of the present invention may vary depending upon the intentions of users or operators or usual practices. The definition of such terms must be made based on the disclosure of the present invention.

A sensor applied to the present invention may include a flow sensor or a differential pressure sensor.

In an embodiment of the present invention, a single differential pressure sensor is used, which is technically distinguished from the case in which two pressure sensors are used. In the case in which two pressure sensors are used, a difference in pressure between two positions may be calculated using a difference in pressure measured by the two pressure sensors.

In general, a pressure sensor measures pressure in increments of 100 Pa. Since a differential pressure sensor is used in an embodiment of the present invention, it is possible to more accurately measure a difference in pressure than in the case in which a general pressure sensor is used. The differential pressure sensor cannot measure an absolute pressure value at a position at which measurement is performed but can calculate a difference in pressure between two positions. Consequently, it is possible for the differential pressure sensor to easily measure a difference in pressure in smaller increments than pressure sensors.

In addition, in the case in which two pressure sensors are used, increased costs, related to the use of two sensors, are incurred, and a large amount of resources, such as electrical wires, for installing the two sensors are needed. In contrast, in the case in which a single differential pressure sensor is used, costs and resources necessary to install the sensor may be reduced.

A differential pressure sensor is installed in a space in which air that has passed through a storage compartment is cooled by an evaporator. Air supplied from the storage compartment contains a large amount of water due to food stored in the storage compartment. When heat exchange is performed between the air and the evaporator, therefore, a large number of water drops may be generated as the result of cooling the air. That is, the differential pressure sensor is installed in a high-humidity space.

In addition, when a refrigerant is evaporated by the evaporator, the temperature around the evaporator is very low. In contrast, when the refrigerant is not evaporated by the evaporator, the temperature around the evaporator is similar to the temperature in the storage compartment. The space in which the evaporator is installed has high temperature variation depending on the condition in which the evaporator is used.

Since the space in which the evaporator is installed has high temperature variation and high humidity, various errors may be generated, and it may be difficult to accurately measure information using general sensors. Since a differential pressure sensor is used in an embodiment of the present invention, however, it is possible to more accurately sense information even under adverse conditions than in the case in which other kinds of sensors are used.

Hereinafter, an exemplary embodiment of the present invention capable of concretely accomplishing the above objects will be described with reference to the accompanying drawings.

FIG. 1 is a side cut-away view showing a refrigerator according to an embodiment of the present invention, FIG.

Figure 2:
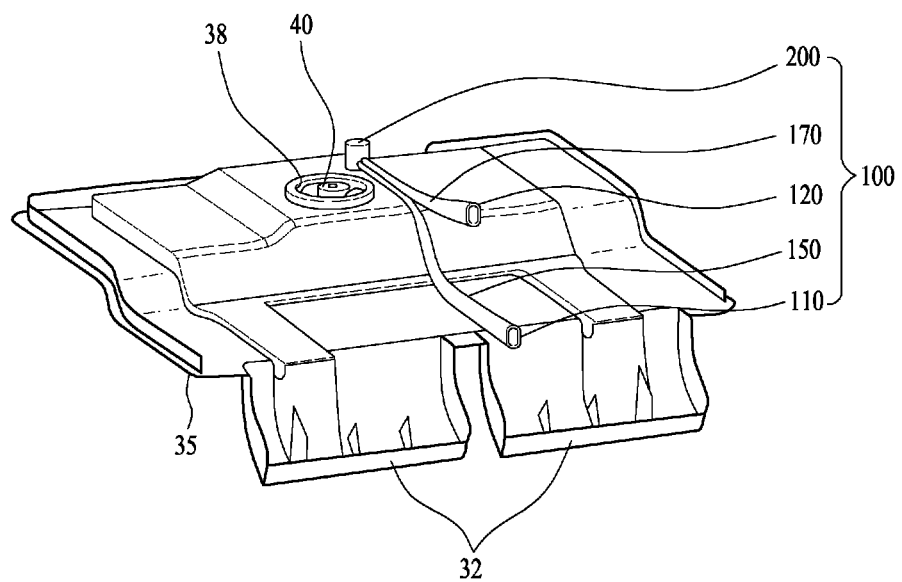
FIG. 2 is a view illustrating a principal part of FIG. 1.
Figure 3:
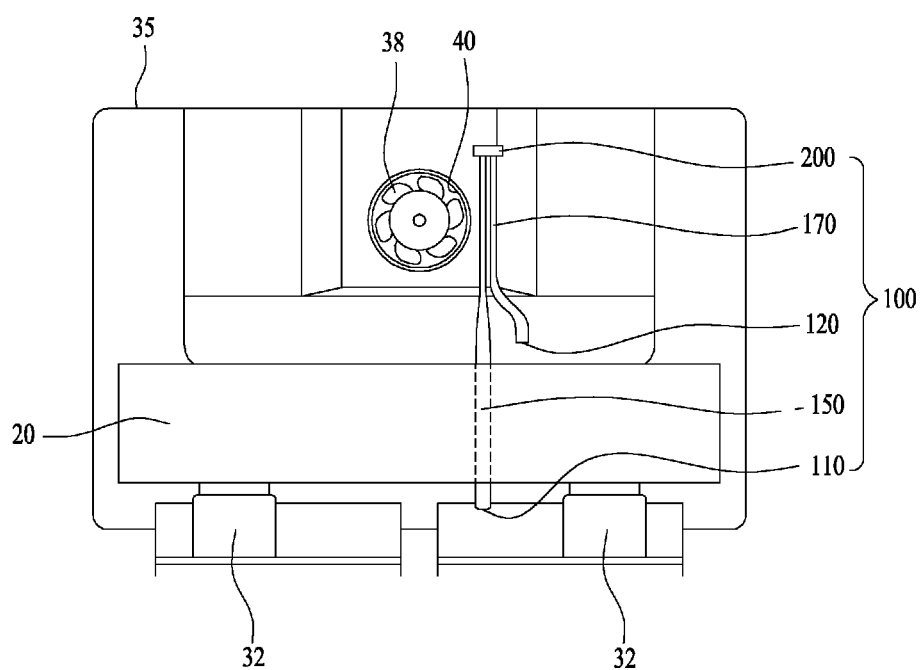
FIG. 3 is a plan view of FIG. 2.

2 is a view illustrating a principal part of FIG. 1, and FIG. 3 is a plan view of FIG. 2. An evaporator is omitted from FIG. 2 for simplicity.

Hereinafter, a description will be given with reference to FIGS. 1 to 3.

The refrigerator includes a cabinet 2, having a plurality of storage compartments 6 and 8 defined therein, and doors 4 for opening and closing the storage compartments 6 and 8.

The storage compartments 6 and 8 include a first storage compartment 6 and a second storage compartment 8. The first storage compartment 6 and the second storage compartment 8 may constitute a refrigerating compartment and a freezing compartment, respectively. Alternatively, the first storage compartment 6 and the second storage compartment 8 may constitute a freezing compartment and a refrigerating compartment, respectively. In yet another alternative, both the first storage compartment 6 and the second storage compartment 8 may constitute refrigerating compartments or freezing compartments.

In the storage compartments 6 and 8 is provided a storage compartment temperature sensor 90 for measuring the temperature in the storage compartments 6 and 8. Alternatively, the temperature sensor 90 may be installed in each of the storage compartments 6 and 8 to individually measure the temperature in each storage compartment.

At the rear of the storage compartments is provided a case 35 for accommodating an evaporator 20.

The case 35 is provided with an outlet 38, through which air is supplied from the case 35 to the storage compartments, and with an inlet 32, through which air is supplied from the storage compartments into the case 35.

In the inlet 32 is provided an introduction pipe 30 for guiding air into the case 35. As a result, the storage compartments 6 and 8 may be connected to the case 35 in order to define an airflow path.

In the outlet 38 is provided a fan 40, which may enable air to flow from the case 35 to the storage compartments 6 and 8. The case 35 has a hermetically sealed structure, excluding the inlet 32 and the outlet 38. When the fan 40 is driven, therefore, air flows from the inlet 32 to the outlet 38.

The air having passed through the fan 40, i.e. cool air, may be supplied to the first storage compartment 6 through a duct 7 for guiding air to the first storage compartment 6. The air having passed through the fan 40 may also be supplied to the second storage compartment 8.

In the case 35 is accommodated the evaporator 20, which evaporates a refrigerant compressed by a compressor 60 in order to generate cool air. The air in the case 35 is cooled as the result of heat exchange with the evaporator 20.

Under the evaporator 20 is provided a heater for generating heat to defrost the evaporator 20. It is not necessary to install the heater 50 under the evaporator 20. It is sufficient to provide the heater in the case 35 in order to heat the evaporator 20.

An evaporator temperature sensor 92 may be provided at the evaporator 20 to measure the temperature of the evaporator 20. When the refrigerant, passing through the evaporator 20, is evaporated, the evaporator temperature sensor 92 may sense a low temperature. When the heater 50 is driven, the evaporator temperature sensor 92 may sense a high temperature.

The compressor 60 may be installed in a machinery compartment, which is provided in the cabinet 2, to compress the refrigerant that is supplied to the evaporator 20. The compressor 60 is installed outside the case 35.

The inlet 32 is located under the evaporator 20, and the outlet 38 is located above the evaporator 20. The outlet 38 is located higher than the evaporator 20, and the inlet 32 is located lower than the evaporator 20.

When the fan 40 is driven, therefore, air moves upwards in the case 35. The air, introduced into the inlet 32, undergoes heat exchange while passing through the evaporator 20, and is discharged out of the case 35 through the outlet 38.

A sensor 100 is provided in the case 36. In an embodiment, the sensor 100 includes a differential pressure sensor.

The differential pressure sensor 100 includes a first through-hole 110, disposed between the evaporator 20 and the inlet 32, and a second through-hole 120, disposed between the evaporator 20 and the outlet 38.

The differential pressure sensor 100 includes a main body for interconnecting the first through-hole 110 and the second through-hole 120. The main body includes a first pipe 150, having the first through-hole 110 formed therein, a second pipe 170, having the second through-hole 120 formed therein, and a connection member 200 for interconnecting the first pipe 150 and the second pipe 170.

The connection member 200 may be disposed higher than the evaporator 20 in order to prevent moisture condensed on the evaporator 20 from falling to the connection member 200. An electronic device may be installed at the connection member 200. If water drops fall to the connection member, the electronic device may be damaged. The water drops, formed on the evaporator 20, fall due to gravity. In the case in which the connection member 200 is disposed above the evaporator 20, the water drops formed on the evaporator 20 do not fall to the connection member 200.

Meanwhile, the first pipe 150 and the second pipe 170 may extend higher than the evaporator 20. In order to locate the connection member 200 above the evaporator 20, it is necessary for the first pipe 150 and the second pipe 170 to extend higher than the evaporator 20.

The first through-hole 110 and the second through-hole 120 may be disposed so as to face downwards, whereby it is possible to prevent the water drops condensed in the case 35 from being introduced into the first pipe 150 and the second pipe 170 through the first through-hole 110 and the second through-hole 120, respectively. If the first through-hole 110 and the second through-hole 120 are disposed so as to face upwards, water drops falling due to gravity may be introduced into the first pipe 150 and the second pipe 170 through the first through-hole 110 and the second through-hole 120, respectively, whereby the value measured by the differential pressure sensor 100 may be erroneous.

The differential pressure sensor 100 senses a difference in pressure between the air passing through the first through-hole 110 and the air passing the second through-hole 120. Since the first through-hole 110 and the second through-hole 120 are installed at different heights and the evaporator 20 is disposed therebetween, a difference in pressure occurs. A relatively low pressure is applied to the second through-hole 120, which is a low-pressure part, and a relatively high pressure is applied to the first through-hole 110, which is a high-pressure part. Consequently, the differential pressure sensor 100 senses a difference in pressure.

Since air flows in the case 35 particularly when the fan 40 is driven, the differential pressure sensor 100 may measure a difference in pressure.

Figure 4:
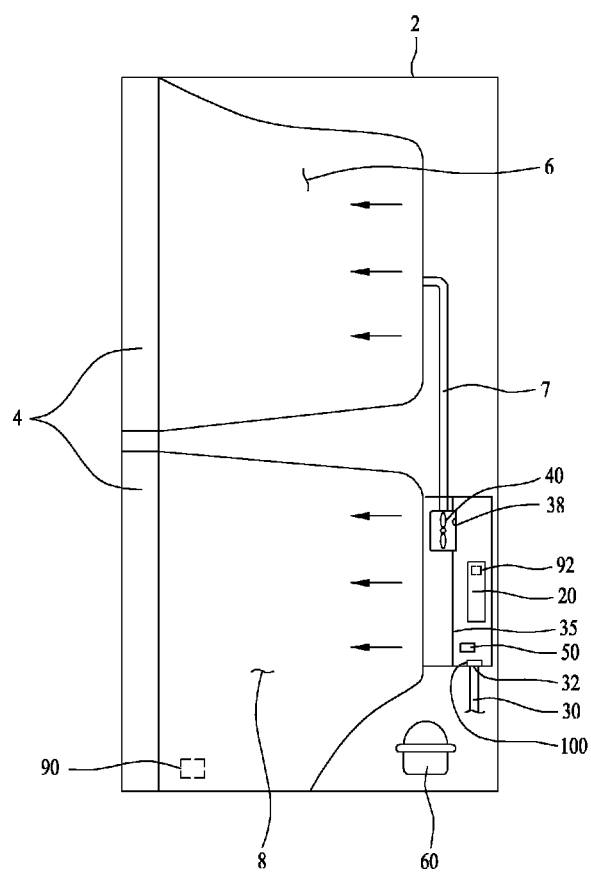
FIG. 4 is a side cut-away view showing a refrigerator according to another embodiment of the present invention.

FIG. 4 is a side cut-away view showing a refrigerator according to another embodiment of the present invention.

In this embodiment, the sensor includes a flow sensor. This embodiment is different from the previous embodiment in that the flow sensor is used instead of the differential pressure sensor. Therefore, a duplicate description of the same elements will be omitted, and only different elements will be described.

Referring to FIG. 4, the flow sensor may measure the flow rate of moving air, and therefore the two through-holes may not be disposed at different heights, unlike the differential pressure sensor.

As shown in FIG. 4, the flow sensor 100 may be provided in the inlet 32 to measure the flow rate of air that is introduced into the case 35.

Alternatively, the flow sensor 100 may be provided in the outlet 38 to measure the flow rate of air that is discharged from the case 35 to the outside.

Since the amount of air that is introduced through the inlet 32 or discharged through the outlet 38 is increased particularly when the fan 40 is driven, the flow sensor may measure the flow rate of moving air.

Figure 5:
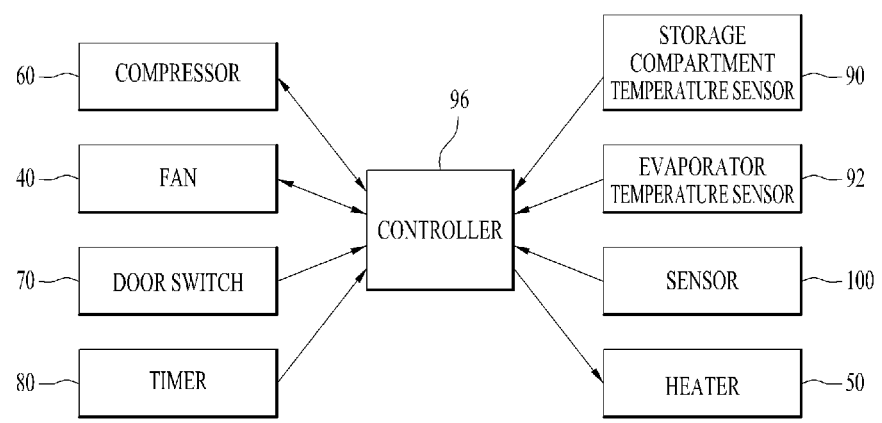
FIG. 5 is a control block diagram according to the present invention.

FIG. 5 is a control block diagram according to the present invention.

Referring to FIG. 5, the refrigerator according to the present invention includes a compressor 60 for compressing a refrigerant. When it is necessary to cool storage compartments, a controller 96 may perform control to drive the compressor 60 in order to supply cool air to the storage compartments. Information about whether the compressor 60 is driven may be transmitted to the controller 96.

In addition, the refrigerator includes a fan 40 for generating an air flow to supply cool air to the storage compartments. Information about whether the fan 40 is driven may be transmitted to the controller 96, and the controller 96 may transmit a signal for driving the fan 40.

A door switch 70 for acquiring information about whether doors 4, for opening and closing the storage compartments, open and close the storage compartments is provided. Door switches 70 may be individually provided at the respective doors to sense whether the doors open and close the respective storage compartments.

In addition, a timer 80 for sensing an elapsed time is provided. The time measured by the timer 80 is transmitted to the controller 96. For example, the controller 96 may receive a signal indicating that the doors 4 to the storage compartments are closed from the door switch 70, and may then receive information about the elapsed time after the doors 4 to the storage compartments are closed based on the time measured by the timer 80.

Information about the temperature in the storage compartments, measured by a storage compartment temperature sensor 90 for measuring the temperature in the storage compartments, may be transmitted to the controller 96.

When defrosting is performed, information about the temperature of the evaporator, measured by an evaporator temperature sensor 92 for measuring the temperature of the evaporator, may also be transmitted to the controller 96. The controller 96 may perform control to finish defrosting of the evaporator according to the information about the temperature of the evaporator, measured by the evaporator temperature sensor 92.

In addition, a heater 50 for heating the evaporator may be provided, and the controller 96 may issue a command to drive the heater 50. When defrosting is started, the controller 96 may perform control to drive the heater 50. When defrosting is finished, the controller 96 may perform control to finish driving of the heater 50.

In the present invention, information measured by the sensor 100 is transmitted to the controller 96. The sensor may include a flow sensor or a differential pressure sensor. In the case in which the sensor is a flow sensor, information about the flow rate of air measured by the flow sensor is transmitted to the controller 96. In the case in which the sensor is a differential pressure sensor, information about a difference in pressure measured by the differential pressure sensor is transmitted to the controller 96.

The controller 96 may acquire a defrosting time of the evaporator or information as to whether defrosting is performed normally and whether the sensor has broken down using information about the sensor 100.

In another embodiment of the present invention, in which the sensor 100 includes a flow sensor, defrosting may be determined as follows. In the case in which the amount of moving air, measured by the flow sensor 100, is reduced to a set value or less when the fan 40 is driven, the controller 96 may perform control to drive the heater 50.

In the state in which no ice is formed on the evaporator 20, air flow generated by the fan 40 when the fan 40 is driven is not greatly impeded. When ice is formed on the evaporator 20, however, air resistance in the case 35 increases. Even when the fan 40 is driven at the same rpm, therefore, a relatively small amount of air flows.

In another embodiment of the present invention, therefore, it is possible to determine whether it is necessary to defrost the evaporator 20 based on information about the flow rate measured by the flow sensor 100 when the fan 40 is driven.

That is, in the case in which the flow rate measured by the flow sensor 100 is reduced to a set value, the heater 50 is driven to melt or remove ice formed on the evaporator 20. Here, the set value is the flow rate value that is necessary for defrosting based on the amount of frost formed on the evaporator 20, which may be stored by manufactures who manufacture refrigerators.

The process of determining whether defrosting failed in another embodiment of the present invention will be described.

In the case in which the sensor includes the flow sensor 100, the flow rate measured by the flow sensor 110 after defrosting is performed may be smaller than a normal flow rate. A considerably large amount of ice may be formed on the evaporator 20, whereby direct heat exchange between the evaporator 20 and air may not be smoothly performed.

In this case, the flow of air passing through the evaporator 20 is not smooth. As a result, the amount of air that passes through the flow sensor 100 may be reduced. That is, when an amount of air that is smaller than the amount of air that passes through the flow sensor 100 is measured in the state in which the evaporator 20 is sufficiently defrosted, the set value of the flow rate of air that starts to defrost the evaporator 20 may be reduced when subsequent defrosting is performed.

That is, even in the case in which a smaller amount of ice is formed on the evaporator 20 than when previous defrosting was performed, the heater 50 may be driven in order to defrost the evaporator 20. In another embodiment, whether the evaporator 20 was sufficiently defrosted is determined by the flow rate of air after previous defrosting was performed. In the case in which the flow rate of air does not reach a normal range even after defrosting is performed, the set value of the flow rate of air at the time of performing defrosting may be reduced when subsequent defrosting is performed such that defrosting can be performed earlier than before. Consequently, the evaporator 20 may be smoothly defrosted.

In addition, in the case in which the set value of the flow rate of air is reduced, the set value of the temperature of the evaporator 20 to finish defrosting of the evaporator 20 may also be changed. That is, the evaporator 20 may be heated to a higher temperature than when previous defrosting was performed such that the evaporator 20 can be defrosted for a longer time. The time for which the heater 50 is driven may be increased in order to supply a larger amount of heat to the evaporator and to reduce the amount of ice formed on the evaporator 20.

Figure 6:
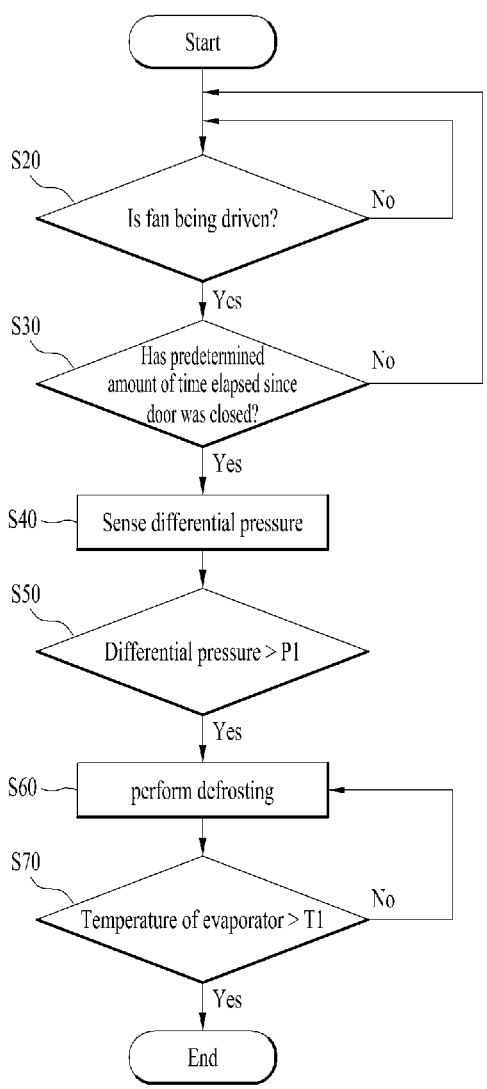
FIG. 6 is a control flowchart for sensing frost formed on an evaporator according to an embodiment.

FIG. 6 is a control flowchart for sensing frost formed on the evaporator according to an embodiment.

Referring to FIG. 6, in an embodiment of the present invention, a step (S40) of sensing a difference in pressure between the first through-hole 110, disposed between the inlet 32, through which air is introduced from the storage compartments 6 and 8, and the evaporator 20, and the second through-hole 120, disposed between the outlet 38, through which air is discharged to the storage compartments 6 and 8, and the evaporator 20 using a single differential pressure sensor 100 and a step of driving the heater 50 to defrost the evaporator 20 when the difference in pressure is greater than a set pressure are included.

Meanwhile, the term "difference in pressure" used in this specification may be the value of difference in pressure that is measured once or the average of the values of difference in pressure that are measured several times. The pressure measured by the differential pressure sensor 100 may be temporarily abnormal due to various external factors. In the case in which the average value of difference in pressure is used, reliability to the difference in pressure measured by the differential pressure sensor 100 may be improved.

In the case in which the value of difference in pressure measured by the differential pressure sensor 100 is greater than the set pressure, this means that the difference in pressure between the first through-hole 110 and the second through-hole 120 increases. An increase in the difference in pressure may mean that the amount of ice formed on the evaporator 20 is increased and thus it is difficult for the evaporator 20 to smoothly perform heat exchange. As a result, cool air is not smoothly supplied from the evaporator 20 to the storage compartments 6 and 8. Consequently, it may be necessary to defrost the evaporator.

In addition, whether the fan 40 is being driven may be determined before the difference in pressure is sensed (S20).

Air flow is generated between the first through-hole 110 and the second through-hole 120, and a difference in pressure therebetween may be smoothly measured by the differential pressure sensor 100, only when the fan 40 is driven.

In the state in which the fan 40 is not driven, therefore, the differential pressure sensor 100 may not measure a difference in pressure.

The storage compartments 6 and 8 are closed by the doors 4, and the door switch 70 determines whether a predetermined amount of time has elapsed, and if not, the differential pressure sensor 100 may not measure a difference in pressure (S30). The door switch 70 may determine whether the doors 4 are in a closed state before the elapsed time is measured by the timer 80. Here, the elapsed time may be about 1 minute. However, the elapsed time may be changed variously.

Air flow in the case 35 in the state in which the storage compartments 6 and 8 are not closed by the doors 4 may be different from air flow in the state in which the case 35 is closed.

In addition, in the state in which the doors 4 are closed and the predetermined amount of time has not elapsed, unexpected air flow to the inlet 32 or to the outlet 38 may be generated as the result of closing the doors 4.

When the differential pressure sensor 100 measures a difference in pressure in this state, therefore, the measured difference in pressure may not properly reflect the pressure in the case 35. In the case in which a defrosting time of the evaporator 20 is determined using such incorrect information, the heater 50 may be unnecessarily frequently driven, or the heater 50 may not be driven at a necessary time, whereby the evaporator 20 cannot be defrosted.

Subsequently, a difference in pressure between the first through-hole 110 and the second through-hole 120 is measured by the differential pressure sensor 100 (S40). Information about the measured difference in pressure may be transmitted to the controller 96.

The controller 96 compares the measured difference in pressure, i.e. the differential pressure, with a set pressure P1 (S50). When the differential pressure is higher than the set pressure P1, it may be determined that a large amount of ice is formed on the evaporator 20, whereby it is necessary to defrost the evaporator. In the case in which a large amount of ice is formed on the evaporator 20, it is difficult for the evaporator 20 to sufficiently perform heat exchange, whereby it is difficult to supply a sufficient amount of cool air to the storage compartments 6 and 8. The set pressure P1 may be set to about 20 Pa. However, the set pressure may be changed in consideration of the capacity, size, and the like of the refrigerator.

The controller 96 performs control to drive the heater 50 such that heat is supplied to the evaporator 20 in order to defrost the evaporator (S60). The evaporator 20 is disposed in the same space partitioned in the case 35 as the space in which the heater 50 is disposed. When the heater 50 is driven, therefore, the temperature in the case 35 may be increased, whereby the temperature of the evaporator 20 may be increased.

As a result, some of the ice formed on the evaporator may melt and change into water, some of which may fall from the evaporator 20. Consequently, the area of the evaporator 20 that can directly exchange heat with air may be increased, thereby improving the heat-exchange efficiency of the evaporator 20.

While defrosting is performed, i.e. while the heater 50 is driven, the evaporator temperature sensor 92 measures the temperature of the evaporator 20. When the temperature of the evaporator 20 exceeds a set temperature T1, it is determined that the evaporator 20 was sufficiently defrosted (S70).

That is, the controller 96 may perform control to stop driving the heater 50. That the temperature of the evaporator 20 exceeds the set temperature T1 may not mean that all of the ice formed on the evaporator 20 is removed, but may mean that the evaporator 20 is ready to supply cool air to the storage compartments 6 and 8.

If the temperature of the evaporator 20 does not increase to the set temperature T1, it may be determined that the evaporator 20 was not sufficiently defrosted, and the heater 50 may continue to be driven to supply heat to the evaporator.

In an embodiment, the defrosting time of the evaporator 20 is determined based on the differential pressure measured by the differential pressure sensor 100. In order to improve the reliability of the differential pressure measured by the differential pressure sensor 100, the condition in which air flow in the case 35 is stabilized may be added.

In the case in which the evaporator 20 is unnecessarily frequently defrosted, the heater 50 is frequently driven. As a result, the amount of power consumed by the heater 50 is increased, whereby the overall energy efficiency of the refrigerator is reduced.

In addition, when hot air supplied from the heater 50 is introduced into the storage compartments 6 and 8 through the inlet or the outlet, the food stored in the storage compartments may rot. In addition, a larger amount of cool air may need to be supplied to the evaporator 20 in order to cool the air that is heated by the hot air supplied from the heater 50.

Therefore, an embodiment may provide a refrigerator capable of reliability determining a defrosting time to reduce unnecessary power consumption, whereby the overall energy efficiency thereof is improved, and a method of controlling the same.

Figure 7:
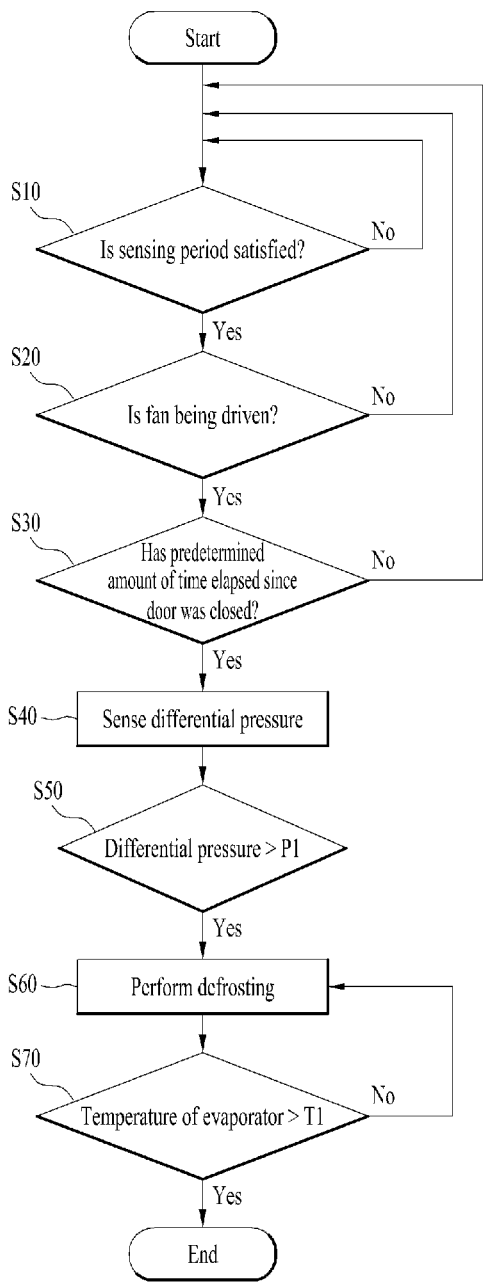
FIG. 7 is a control flowchart for sensing frost formed on the evaporator according to a modified embodiment.

FIG. 7 is a control flowchart for sensing frost formed on the evaporator according to a modified embodiment.

Referring to FIG. 7, it is determined whether a sensing period using the differential pressure sensor 100 is satisfied (S10) before a step (S20) of determining whether the fan is driven, unlike the embodiment described with reference to FIG. 6.

The sensing period means a time interval at which differential pressure is measured using the differential pressure sensor 100. For example, the sensing period may be set to 20 seconds. However, the sensing period may be changed depending on various conditions.

In this modified embodiment, when the differential pressure is measured using the differential pressure sensor 100, the differential pressure sensor 100 measures the differential pressure in the sensing period, i.e. at a predetermined time interval, whereby the amount of power consumed by the differential pressure sensor 100 may be reduced.

If the differential pressure sensor 100 continuously measures the differential pressure regardless of the sensing period, the amount of power consumed by the differential pressure sensor 100 and the amount of power necessary to transmit information measured by the differential pressure sensor 100 to the controller 96 may be increased.

In this modified embodiment, therefore, the differential pressure sensor 100 measures the differential pressure in the sensing period in order to improve the energy efficiency of the refrigerator.

The other steps of FIG. 7 are identical to those of FIG. 6, and therefore a duplicate description of the same steps will be omitted.

Figure 8:
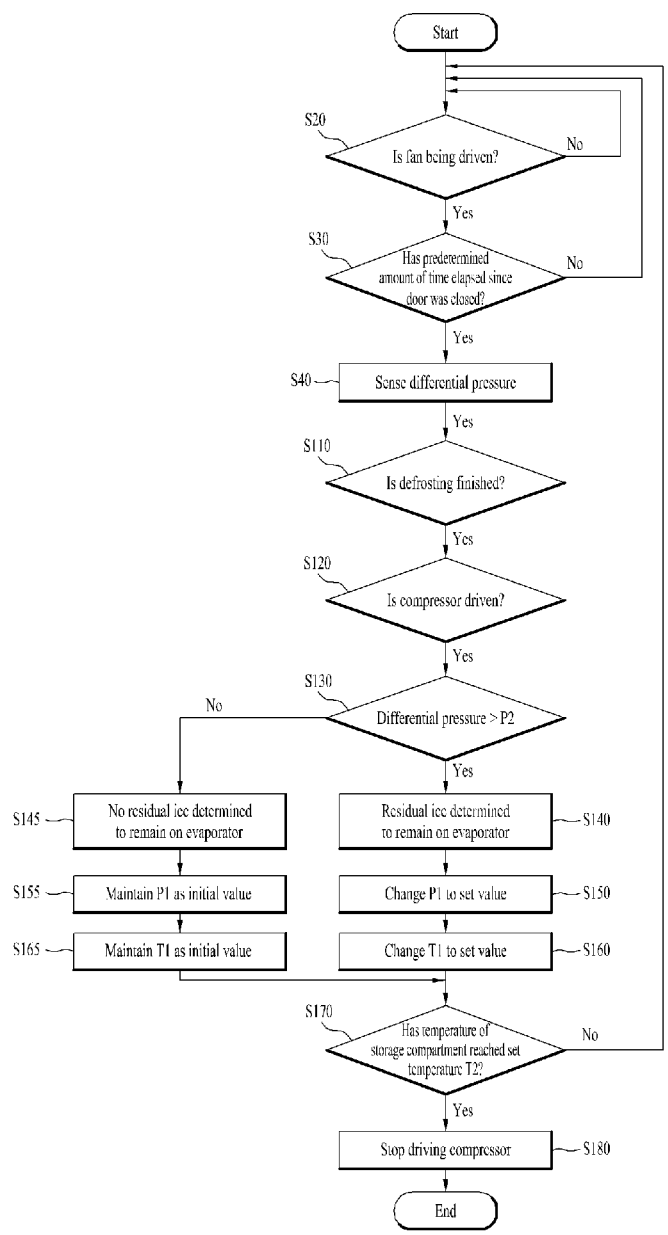
FIG. 8 is a control flowchart for sensing whether defrosting failed according to an embodiment.

FIG. 8 is a control flowchart for sensing whether defrosting has failed according to an embodiment.

Steps S20 to S40 of FIG. 8 are identical to those described above, and therefore a duplicate description of the same steps will be omitted.

Referring to FIG. 8, it is determined first whether defrosting of the evaporator 20 is finished (S110). The reason for this is that the determination as to whether defrosting failed is a determination as to whether defrosting of the evaporator 20 was performed normally after the defrosting is performed. As previously described, in the case in which the differential pressure measured by the differential pressure sensor 100 exceeds a first set pressure P1, defrosting may be performed. In addition, the evaporator 20 may be heated until the temperature of the evaporator 20 reaches a first set temperature T1, and then defrosting may be finished.

The finishing of defrosting may mean that the driving of the heater 50 is stopped, that a predetermined amount of time has elapsed since the driving of the heater 50 was stopped, or that another predetermined operation is finished after the driving of the heater 50 is stopped.

After defrosting is finished, it is determined whether the driving of the compressor 60, which compresses the refrigerant, is commenced (S120).

At the time at which the compressor 60 is driven, i.e. at the time at which cool air is supplied to the storage compartments 6 and 8, after defrosting is finished, it may be determined whether previous defrosting was performed normally.

At this time, it may be determined whether previous defrosting was performed normally only after the compressor 60 is driven for the first time and before the driving thereof is stopped. Frost may be formed on the evaporator 20 after the compressor 60 is driven to complete one-cycle cooling. If it is determined whether defrosting of the evaporator 20 was completed normally after one-cycle driving is performed, therefore, errors may occur.

In the case in which the differential pressure measured by the differential pressure sensor 100 exceeds a second set pressure P2, the controller determines that residual ice remains on the evaporator 20 even though defrosting was performed beforehand (S140).

Here, the first set pressure P1 may be higher than the second set pressure P2. The reason for this is that, if the first set pressure P1, which is a differential pressure at which defrosting is performed, is maintained even after defrosting is completed, the defrosting effect is negligible.

Meanwhile, the reason for this is that, in the case in which the differential pressure is the second set pressure P2 even after defrosting is performed, it is determined that previous defrosting was not performed normally, but it is not necessary to additionally perform defrosting immediately. If defrosting is unnecessarily frequently performed, as previously described, the energy efficiency of the refrigerator may be reduced.

Upon determining that residual ice remains on the evaporator 20, the first set pressure P1, based on which subsequent defrosting is performed, may be changed to a set value (S150). Changing the first set pressure P1 to the set value may mean decreasing the first set pressure P1.

The first set pressure P1 may be continuously decreased. However, the first set pressure P1 may be changed to the set value so as to be decreased only once. For example, in the case in which the first set pressure P1 is 20 Pa when previous defrosting was performed and it is determined that defrosting was not performed normally, the first set pressure P1, based on which subsequent defrosting is performed, may be changed once to 10 Pa.

Of course, the decreased first set pressure P1 may be equal to or higher than the second set pressure P2. The reason for this is that the first set pressure P1 is given to determine the defrosting time and the second set pressure P2 is given to determine whether previous defrosting was performed normally.

Upon determining that previous defrosting was not performed normally, the first set temperature T1, at which the evaporator 20 is heated, may be changed to a set value when subsequent defrosting is performed (S160). Changing the first set temperature T1 to the set value may mean increasing the first set temperature T1.

The first set temperature T1 may be continuously increased. However, the first set temperature T1 may be increased only once. For example, in the case in which the first set temperature T1 is 5 degrees when previous defrosting was performed and it is determined that defrosting was not performed normally, the temperature of the evaporator 20 necessary to finish subsequent defrosting, i.e. the first set temperature T1, may be changed once to 7 degrees.

In an embodiment, upon determining that previous defrosting was not performed normally, subsequent defrosting may be commenced earlier and for a longer time. Consequently, a larger amount of ice formed on the evaporator 20 may be removed than was removed upon previous defrosting.

It is sensed whether the temperature of the storage compartments measured by the storage compartment temperature sensor 90 reaches a second set temperature T2, and related information is transmitted to the controller 96 (S170). Here, the second set temperature T2 may mean a temperature set to cool the storage compartments. In the case in which the storage compartments are freezing compartments, the second set temperature may be a subzero temperature. In the case in which the storage compartments are refrigerating compartments, the second set temperature may an above-zero temperature.

When the temperature of the storage compartments reaches the second set temperature T2, it is determined that the storage compartments 6 and 8 no longer need to be cooled, and the driving of the compressor 60 is stopped (S180).

When the temperature of the storage compartments does not reach the second set temperature T2, which means that one cycle of the compressor 60 to cool the storage compartments 6 and 8 is not finished, the differential pressure sensor 100 may continuously sense whether previous defrosting was performed normally.

When the differential pressure measured by the differential pressure sensor 100 is higher than the second set pressure P2 at step S130, it is determined that no residual ice remains on the evaporator 200 after previous defrosting is finished (S145).

In the case in which the first set pressure P1 was changed or decreased to the set value previously based on information about the differential pressure measured by the differential pressure sensor 100, the first set pressure P1 is maintained as an initial value. That is, the first set pressure P1 becomes equal to the first set pressure P1 when previous defrosting was performed (S155).

In addition, in the case in which the first set temperature T1 was changed or increased to the set value previously based on information about the differential pressure measured by the differential pressure sensor 100, the first set temperature T1 is maintained as an initial value. That is, the first set temperature T1 becomes equal to the first set temperature T1 when previous defrosting was performed (S165).

In an embodiment, when defrosting is finished and the driving of the compressor 60 is commenced, it is determined whether previous defrosting was performed normally. That defrosting was performed normally may mean that the amount of ice formed on the evaporator 20 is sufficiently reduced, whereby the area of the evaporator 20 that can directly exchange heat with air is sufficiently secured.

While the storage compartments are cooled to the second set temperature T2 by the compressor 60 after defrosting is finished, it may be determined whether previous defrosting was performed normally based on the differential pressure measured by the differential pressure sensor 100. In the case in which a difference in pressure between the upper side of the evaporator 20 and the lower side of the evaporator 20 is not great based on the differential pressure measured by the differential pressure sensor 100 after defrosting is finished, it is determined that defrosting of the evaporator 20 was not performed normally. The conditions for defrosting the evaporator 20 may be changed.

The above-described differential pressure, i.e. the difference in pressure, may mean the average of the values of difference in pressure that are measured by the differential pressure sensor 100. A difference in pressure may be measured several times by the differential pressure sensor 100, the average of the measured values of difference in pressure are calculated, and a determination may be performed based on the average in order to reduce errors of incorrect determination based on temporarily abnormal data.

In addition, in an embodiment, it may be determined that previous defrosting was performed abnormally due to temporary errors even though the average is used. Consequently, the differential pressure sensor 100 may measure differential pressure until the driving of the compressor 60 is stopped in order to determine whether previous defrosting was performed normally.

Figure 9:
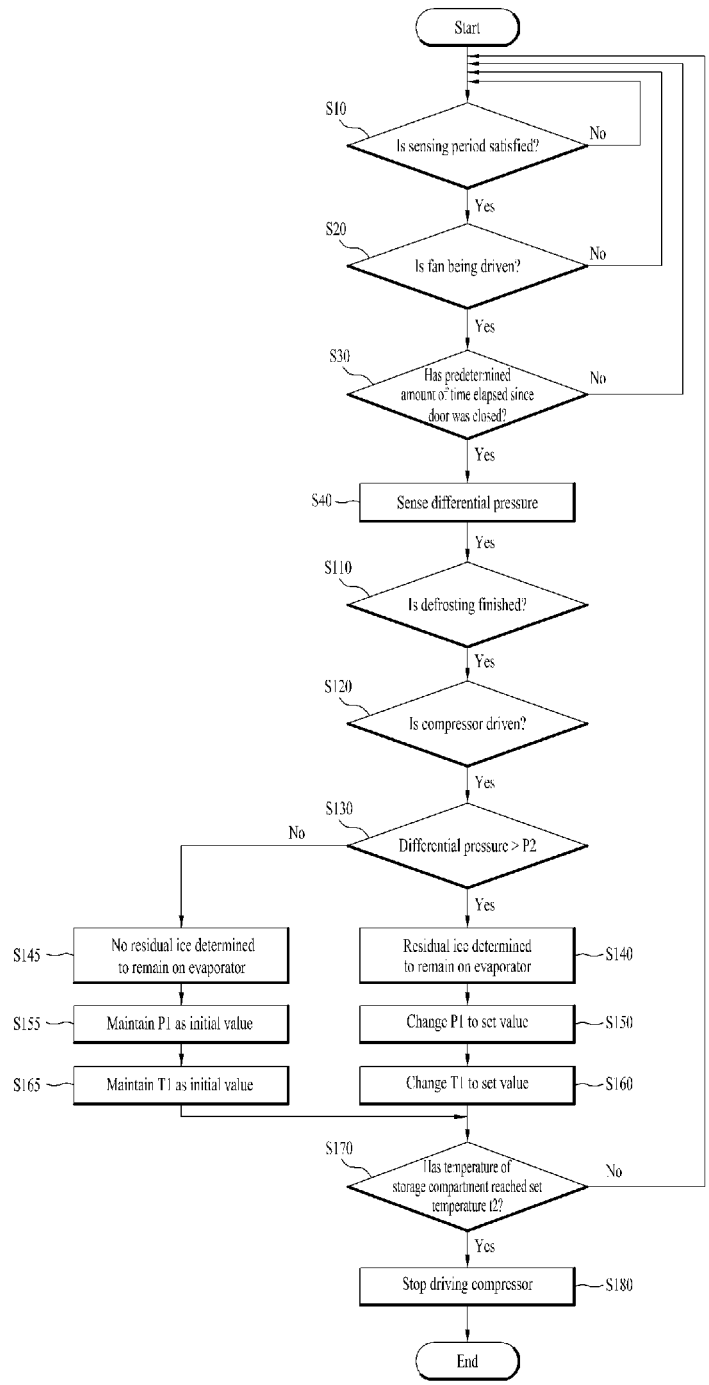
FIG. 9 is a control flowchart for sensing whether defrosting failed according to a modified embodiment.

FIG. 9 is a control flowchart for sensing whether defrosting failed according to a modified embodiment.

Referring to FIG. 9, it is determined whether a sensing period using the differential pressure sensor 100 is satisfied (S10) before a step (S20) of determining whether the fan is driven, unlike the embodiment described with reference to FIG. 8.

The sensing period means a time interval at which differential pressure is measured using the differential pressure sensor 100. For example, the sensing period may be set to 20 seconds. However, the sensing period may be changed depending on various conditions.

In this modified embodiment, when the differential pressure is measured using the differential pressure sensor 100, the differential pressure sensor 100 measures the differential pressure in the sensing period, i.e. at a predetermined time interval, whereby the amount of power consumed by the differential pressure sensor 100 may be reduced.

If the differential pressure sensor 100 continuously measures the differential pressure regardless of the sensing period, the amount of power consumed by the differential pressure sensor 100 and the amount of power necessary to transmit information measured by the differential pressure sensor 100 to the controller 96 may be increased.

In this modified embodiment, therefore, the differential pressure sensor 100 measures the differential pressure in the sensing period in order to improve the energy efficiency of the refrigerator.

Figure 10:
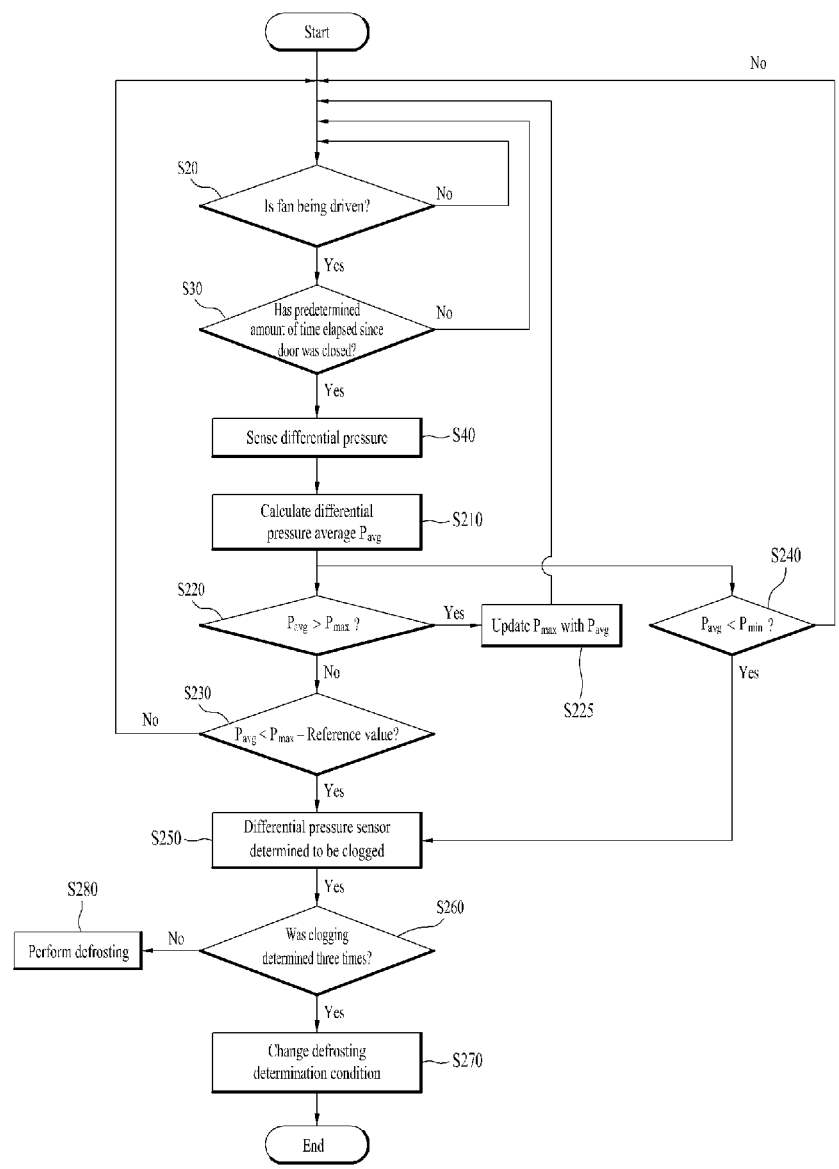
FIG. 10 is a control flowchart for sensing the breakdown of a differential pressure sensor according to an embodiment.

FIG. 10 is a control flowchart for sensing the breakdown of the differential pressure sensor according to an embodiment.

Steps S20 to S40 of FIG. 10 are identical to those described above, and therefore a duplicate description of the same steps will be omitted.

Referring to FIG. 10, in an embodiment, the differential pressure sensor 100 senses a differential pressure (S40), and when the differential pressure is less than a set value, it is determined that the pipes of the differential pressure sensor 100 are clogged.

The differential pressure sensor 100 measures a difference in pressure between the air introduced through the first through-hole 110 and the air introduced through the second through-hole 120. If the pipes having the first through-hole 110 and the second through-hole 120 formed therein are clogged, it is not possible to accurately measure the differential pressure.

In an embodiment, the breakdown of the differential pressure sensor 100 may be determined based on the differential pressure measured by the differential pressure sensor 100, whereby control may be easily performed.

After the differential pressure is measured by the differential pressure sensor 100 several times, a differential pressure average Pavg, which is the average of measured values of differential pressure, is calculated (S210). The differential pressure average Pavg may be calculated by averaging two or more values of differential pressure.

Subsequently, it is determined whether the differential pressure average Pavg is greater than a maximum average Pmax calculated previously (S220).

When the refrigerator is operated and the condition for measurement using the differential pressure sensor 100 is satisfied, the differential pressure sensor 100 continuously measure differential pressure. Consequently, the average of values of differential pressure measured by the differential pressure sensor 100 may be continuously calculated. In the case in which the number of values of differential pressure necessary to calculate the differential pressure average Pavg is set to 10, when the eleventh value of differential pressure is calculated, a new differential pressure average Pavg excluding the first value of differential pressure may be calculated. Of course, the number of values of differential pressure necessary to calculate the differential pressure average Pavg may be variously changed.

When the differential pressure average Pavg is greater than the maximum average Pmax calculated previously, the maximum average Pmax is updated (S225). Consequently, the newly updated maximum average Pmax is increased to the newly calculated differential pressure average Pavg.

That the value of differential pressure measured by the differential pressure sensor 100 is increased may mean that a difference in pressure between the opposite sides of the evaporator 20 is increased, i.e. may mean that frost is formed on the evaporator 20. It is natural that, when the refrigerator is used, frost is continuously formed on the evaporator 20.

That the value of differential pressure measured by the differential pressure sensor 100 is increased may mean that the differential pressure sensor 100 normally measures a difference in pressure between the upper part and the lower part of the evaporator 20.

When the differential pressure average Pavg is equal to or less than the maximum average Pmax calculated previously, a first clogging determination step of determining whether the differential pressure average Pavg is less than the value obtained by subtracting a reference value from the maximum average Pmax is performed (S230).

Here, the reference value may be less than the first set pressure P1, based on which it is determined that defrosting of the evaporator 20 is necessary. Particularly, the reference value may be equal to or less than ⅓ of the first set pressure P1.

At step S230, when the differential pressure measured by the differential pressure sensor 100 is small in the state in which ice is continuously formed on the evaporator 20 and thus a difference in pressure between the upper part and the lower part of the evaporator 20 is continuously increased, it may be determined that the pipes of the differential pressure sensor 100 are clogged.

That is, when differential pressure that is less than the value obtained by subtracting the reference value from the maximum average Pmax is sensed even though the differential pressure average Pavg is less than the maximum average Pmax, it is determined that the pipes of the differential pressure sensor 100 are clogged (S250).

The differential pressure measured by the differential pressure sensor 100 in the state in which the pipes of the differential pressure sensor 100 are clogged is an abnormal value. When a defrosting time is determined based on such information, therefore, the evaporator may be defrosted unnecessarily or later. As a result, the energy efficiency of the refrigerator may be reduced.

At step S210, the differential pressure sensor 100 calculates the differential pressure average Pavg, and a second clogging determination step of determining whether the differential pressure average Pavg is less than a minimum average Pmin is performed (S240). Here, the minimum average Pmin may be a value of differential pressure measured in the state in which no frost is formed on the evaporator 20.

When the differential pressure measured by the differential pressure sensor 100 is less than the minimum average Pmin even though no frost is formed on the evaporator 20, it cannot be considered that differential pressure was measured normally by the differential pressure sensor 100.

The differential pressure sensor 100 calculates a difference in pressure between the upper part and the lower part of the evaporator 20. Basically, since the evaporator impedes air flow, a difference in pressure equivalent to the minimum average Pmin may be maintained. Nevertheless, when the differential pressure sensor 100 measures a differential pressure that is less than the minimum average Pmin, this means that the pipes of the differential pressure sensor 100 are clogged. Consequently, it is not possible for the differential pressure sensor 100 to properly measure differential pressure.

The above situation may be a situation in which ice is instantaneously formed in the pipes of the differential pressure sensor 100 or a situation in which bulky ice falls to regions of the differential pressure sensor 100 that are adjacent to the pipes, whereby the pipes are clogged.

When the measured differential pressure average Pavg is less than the minimum average Pmin, it is determined that the differential pressure sensor 100 is clogged (S250).

In an embodiment, as step S220, the average of the values of differential pressure measured by the differential pressure sensor 100 may be calculated, and then the first clogging determination step and the second clogging determination step may be performed in a parallel fashion in order to sense the breakdown of the differential pressure sensor 100.

That is, when the differential pressure measured by the differential pressure sensor 100 is equal to or greater than a predetermined value but is less than a specific value, it is determined that the differential pressure sensor 100 has broken down.

Upon determining that the differential pressure sensor 100 is clogged as the result of executing the two steps, it is determined whether clogging of the differential pressure sensor 100 was determined a specific number of times, for example, three times (S260).

When clogging of the differential pressure sensor 100 was not determined the specific number of times, the evaporator 20 is defrosted (S280).

The evaporator 20 and the differential pressure sensor 100 are installed in the case 35. When the heater 50 is driven, therefore, the temperature in the case 35 may be increased. As a result, the differential pressure sensor 100 as well as the evaporator 20 may be heated.

When the heater 50 is driven, therefore, ice in the pipes of the differential pressure sensor 100 or ice adjacent to the pipes may melt or be removed. When the heater 50 is driven, therefore, clogging of the differential pressure sensor 100 may be solved.

At this time, the heater 50 may be driven until the temperature of the evaporator 20 reaches the second set temperature T2. That is, the heater may be driven until a defrosting condition described in the present invention is satisfied in order to solve clogging of the differential pressure sensor 100.

When clogging is determined the specific number of times, a condition for determining defrosting is changed (S270).

When defrosting is performed at step S280 until clogging is determined the specific number of times, for example, three times, but clogging of the differential pressure sensor 100 is not solved, it may not be preferable to perform defrosting based on the differential pressure sensor 100.

Consequently, a condition for performing defrosting may be determined based on whether a predetermined amount of time has elapsed since the compressor 60 was driven. When the compressor 60 is driven, the temperature of the evaporator 20 is decreased, since the refrigerant is evaporated by the evaporator. In this state, frost may be formed on the evaporator 20. Consequently, the driving time of the compressor 60 may be used as the time for determining whether defrosting is necessary.

In addition, a condition for performing defrosting may be determined based on whether a specific amount of time has elapsed since the doors 4 opened the storage compartments 6 and 8. When the doors 4 open the storage compartments, external moisture is introduced into the storage compartments, and air from the storage compartments is introduced into the case, whereby the humidity in the case may be increased. When the humidity is increased, the amount of ice formed on the evaporator 20 is increased, whereby frost may be formed on the evaporator.

Meanwhile, a condition for performing defrosting may be determined in consideration both of the driving time of the compressor 60 and of the open time of the doors 4.

In an embodiment, the differential pressure measured by the differential pressure sensor 100 is used in order to sense the breakdown of the differential pressure sensor 100.

The pipes of the differential pressure sensor 100 may be clogged in two situations. In an embodiment, the two situations may be checked in a parallel fashion in order to determine the breakdown of the differential pressure sensor in two situations.

In an initial situation in which the pipes of the differential pressure sensor 100 are clogged, the heater 50 may be driven in order to repair the breakdown of the differential pressure sensor 100.

In the case in which the pipes of the differential pressure sensor 100 are unclogged even using the heater 50, information about the differential pressure acquired by the differential pressure sensor 100 may be ignored, and a defrosting time may be determined based on some other condition. Even when the differential pressure sensor breaks down, therefore, the evaporator 20 may be stably defrosted. When the refrigerator is used, therefore, defrosting may be appropriately performed, whereby the energy efficiency of the refrigerator may be increased.

Figure 11:
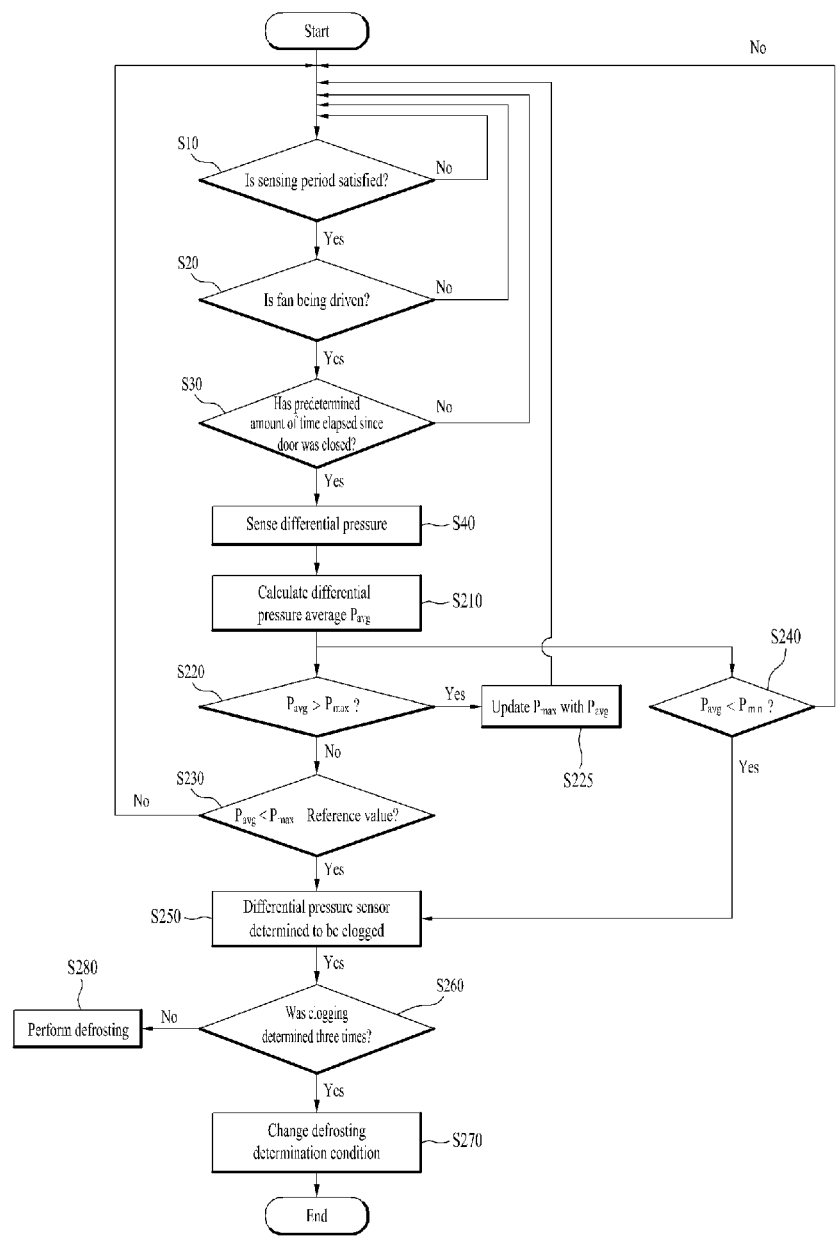
FIG. 11 is a control flowchart for sensing the breakdown of the differential pressure sensor according to a modified embodiment.

FIG. 11 is a control flowchart for sensing the breakdown of the differential pressure sensor according to a modified embodiment.

Referring to FIG. 11, it is determined whether a sensing period using the differential pressure sensor 100 is satisfied (S10) before a step (S20) of determining whether the fan is driven, unlike the embodiment described with reference to FIG. 10.

The sensing period means a time interval at which differential pressure is measured using the differential pressure sensor 100. For example, the sensing period may be set to 20 seconds. However, the sensing period may be changed depending on various conditions.

In this modified embodiment, when the differential pressure is measured using the differential pressure sensor 100, the differential pressure sensor 100 measures the differential pressure in the sensing period, i.e. at a predetermined time interval, whereby the amount of power consumed by the differential pressure sensor 100 may be reduced.

If the differential pressure sensor 100 continuously measures the differential pressure regardless of the sensing period, the amount of power consumed by the differential pressure sensor 100 and the amount of power necessary to transmit information measured by the differential pressure sensor 100 to the controller 96 may be increased.

In this modified embodiment, therefore, the differential pressure sensor 100 measures the differential pressure in the sensing period in order to improve the energy efficiency of the refrigerator.

Figure 12:
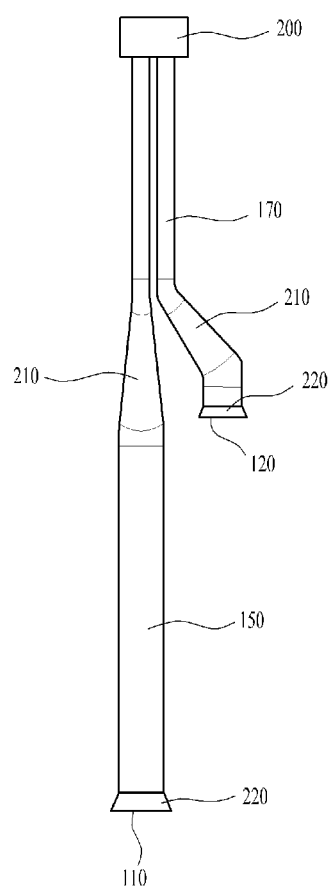
FIG. 12 is a view illustrating an embodiment of a modified differential pressure sensor.

FIG. 12 is a view illustrating an embodiment of a modified differential pressure sensor.

Referring to FIG. 12, the differential pressure sensor 100, which is provided in the case, includes the first pipe 150, having the first through-hole 110 formed therein, the second pipe 170, having the second through-hole 120 formed therein, and the connection member 200 for interconnecting the first pipe 150 and the second pipe 170.

The connection member 200 may include an electronic circuit for sensing a difference in pressure between the first pipe 150 and the second pipe 170. As shown in FIGS. 1 to 3, therefore, the connection member 200 may be disposed higher than the evaporator 20 or the fan 40.

In the case in which the connection member 200 is disposed higher than the evaporator 20, water drops falling from the evaporator 20 are prevented from falling to the connection member 200, whereby it is possible to prevent the connection member 200 from being damaged by the water drops.

Particularly, when the evaporator 20 is defrosted, ice formed on the evaporator 20 is melted, whereby a large number of water drops fall. In the case in which the connection member 200 is disposed under the evaporator 20, the water drops fall to the connection member 200. As a result, the electronic circuit may be adversely affected, whereby the differential pressure sensor 100 may be damaged.

In addition, the connection member 200 may be molded such that water drops are prevented from penetrating into the connection member 200. In addition, the portion of the connection member 200 at which the electronic circuit is installed may be covered such that water drops are prevented from easily penetrating into the electronic circuit.

When the differential pressure sensor 100 is installed, moisture may be introduced into the differential pressure sensor 100, or when the refrigerator is operated, the differential pressure sensor 100 may break down as the result of air flow. Consequently, it is important to choose the installation position of the differential pressure sensor 100 in consideration thereof.

In addition, in the present invention, the connection member 200 may be disposed higher than the fan 40 such that air flow generated by the fan 40 is not impeded. In the structure of FIGS. 1 to 3, air in the case is introduced through the inlet and is discharged through the outlet, and the fan 40 is installed in the outlet. When the connection member 200 is installed above the fan 40, therefore, the connection member 200 does not resist the flow of air rising from the inlet to the output, whereby air flow is not impeded.

Since the differential pressure sensor 100 is installed in the case (see FIGS. 1 to 3), air passing through the storage compartments is cooled by the evaporator 20. Since the air supplied to the storage compartments contains a large amount of moisture due to the food stored in the storage compartments, the air is cooled when the air exchanges heat with the evaporator 20, whereby a large number of water drops may be generated. That is, the humidity of the space in which the differential pressure sensor 100 is installed is high.

In addition, since the temperature of the evaporator 20 is much lower than room temperature, the temperature around the evaporator 20 is very low when the refrigerant is evaporated by the evaporator 20. When the refrigerant is not evaporated by the evaporator 20, however, the temperature around the evaporator is similar to the temperature in the storage compartments. Consequently, the space in which the evaporator is installed has high temperature variation.

Since the space in which the evaporator 20 is installed has high temperature variation and high humidity, it is difficult to accurately measure information using a general sensor. Since the differential pressure sensor is used in the embodiment of the present invention, however, it is possible to more accurately sense information even under adverse conditions than in the case in which other kinds of sensors are used.

The present invention provides various kinds of modified differential pressure sensors in order to accurately measure differential pressure even under such adverse conditions.

Referring to FIG. 12, the section of the portion of the first pipe 150 that is coupled to the connection member 200 is smaller than the section of the portion of the first pipe in which the first through-hole 110 is formed. In addition, the section of the portion of the second pipe 170 that is coupled to the connection member 200 is smaller than the section of the portion of the second pipe in which the second through-hole 120 is formed.

Even when defrost water, generated when the evaporator 20 is defrosted, comes into contact with the first through-hole 110 or the second through-hole 120 and moves into the first pipe 150 and the second pipe 170, therefore, hot air may be easily introduced into the first pipe 150 and the second pipe 170 as the heater is driven, whereby defrosting may be easily performed.

The first pipe 150 may be provided with a bent portion 210, which changes the direction in which the first pipe 150 extends. The first pipe 150 may extend while avoiding the evaporator 20 due to the bent portion 210.

The bent portion 210 may be formed such that the section of the lower side thereof is larger than the section of the upper side thereof. That is, the bent portion 210 may be formed in the shape of a pipe that gradually expands downwards such that the size of the inner section of the first pipe 150 is changed.

The first pipe 150 may not extend downwards, but may be bent at a predetermined angle and then extend downwards by the provision of the bent portion 210 (see FIG. 2). In the case in which the heater is driven and the defrost water generated from the evaporator 20 is changed into vapor as the result of contacting the heater, the water comes into contact with the inner wall of the bent portion 210 even though the water is introduced into the first pipe 150, whereby condensation may be easily performed. In the case in which, the first pipe 150 extends downwards vertically at the same angle, vapor may easily rise to the portion of the first pipe that is coupled to the connection member 200, whereby water drops may be formed on the portion of the first pipe that is coupled to the connection member. In contrast, in the present invention, it is possible to prevent the first pipe 150 from being clogged by vapor, since the tilt angle of the bent portion 210 is changed.

The second pipe 170 may also be provided with a bent portion 210, which changes the direction in which the second pipe 170 extends. The second pipe 170 may extend while avoiding the evaporator 20 due to the bent portion 210.

The bent portion formed at the second pipe 170 performs substantially the same function as the bent portion formed at the first pipe 150 even though the bent portions are different from each other in terms of the concrete shapes thereof. Consequently, the same description may be applied thereto.

Meanwhile, the first pipe 150 or the second pipe 170 may be formed to have a hollow shape, and the hollow shape may have a circular section. In the case in which a hollow in each of the first pipe 150 and the second pipe 170 has a quadrangular section, rather than a circular section, frost is formed at the angled parts of the hollow, whereby an excessive amount of frost may be formed. In contrast, in the case in which the hollow has a circular section, an excessive amount of frost may be prevented from being formed in a specific region of the hollow, whereby it is possible to prevent the hollow from being clogged.

The first pipe 150 or the second pipe 170 may have an inner diameter of 5 mm or more. In the case in which the inner diameter of the first pipe 150 or the second pipe 170 is large, heat generated by the heater may be easily introduced into the first pipe 150 or the second pipe 170 when ice is formed in the first pipe 150 or the second pipe 170, and water drops may easily fall from the first pipe 150 or the second pipe 170 when the ice is melted by the introduced heat. Here, the term "inner diameter" may mean the diameter of the empty space, i.e. the hollow, formed in the first pipe 150 or the second pipe 170.

The first pipe 150 or the second pipe 170 may be provided at one end thereof with a first expanded pipe part 220, the diameter of which gradually increases toward the lower end thereof. The first through-hole 110 or the second through-hole 120 may be formed in the lower end of the first expanded pipe part 220 such that the diameter of the first through-hole 110 or the second through-hole 120 is increased by the first expanded pipe part 220. The first expanded pipe part 220 will be described in more detail with reference to FIG. 13.

FIGS. 13 to 16 are views illustrating embodiments of another modified differential pressure sensor.

Figure 13:
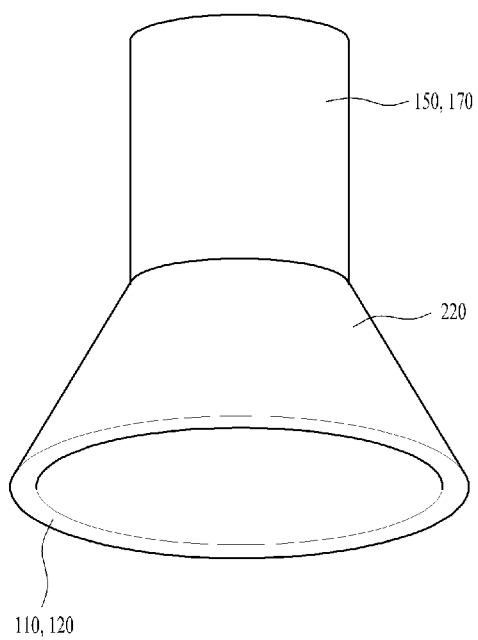
FIGS. 13 to 16 are views illustrating embodiments of another modified differential pressure sensor.

FIG. 13 shows an example in which the first expanded pipe part 220 is provided at one end of the first pipe 150 or the second pipe 170.

The first through-hole 110 or the second through-hole 120 may be formed so as to have a circular section. The first through-hole 110 or the second through-hole 120 may be disposed so as to face downwards in the direction of gravity. Consequently, the defrost water falling from the case, in which the evaporator 20 or the differential pressure sensor 100 is installed, may be prevented from being introduced into the first pipe 150 or the second pipe 170.

The first expanded pipe part 220 may be generally formed so as to have a cylindrical shape having an increasing diameter.

Figure 14:
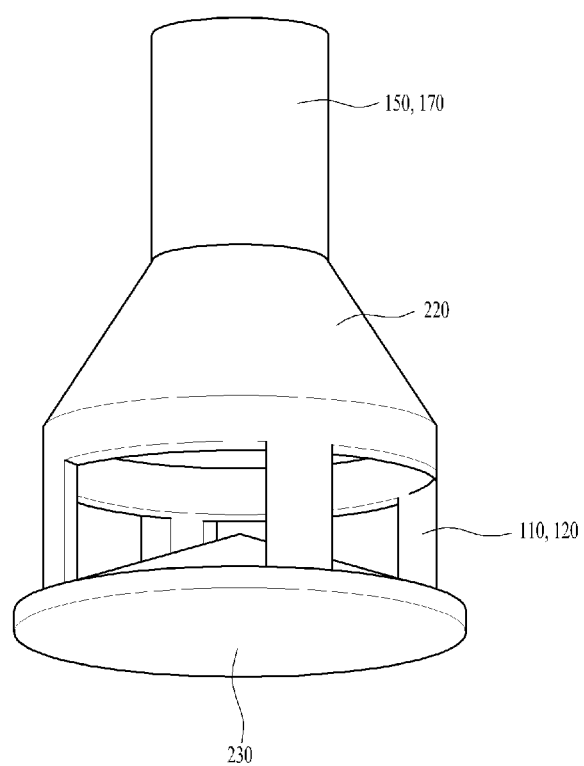

Referring to FIG. 14, the first through-hole 110 or the second through-hole 120 is formed in the side surface of the lower end of the first expanded pipe part 220. In FIG. 14, the first through-hole 110 or the second through-hole 120 is formed in the side surface of the first pipe 150 or the second pipe 170, unlike FIG. 13. Since the first through-hole 110 and the second through-hole 120 are formed in the side surfaces of the first pipe 150 and the second pipe 170 and the first pipe 150 and the second pipe 170 extend downwards in the direction of gravity, it is possible for the differential pressure sensor to more accurately measure differential pressure. The reason for this is that the first through-hole 110 and the second through-hole 120 are disposed in the direction perpendicular to air flow in the case.

Meanwhile, a plurality of first through-holes 110 or a plurality of second through-holes 120 may be formed along the circumference of the first pipe 150 or the second pipe 170.

A cover 230 may be provided at the lower end of the first expanded pipe part 220 to close the lower part of the first expanded pipe part 220. The cover 230 extends so as to have a section larger than the inner diameter of the first expanded pipe part 220, whereby air may be prevented from being introduced into the first pipe 150 or the second pipe 170 through the lower part of the first expanded pipe part 220. In this case, the effect caused by the dynamic pressure of air may be reduced by the cover 230 even when the first pipe 150 or the second pipe 170 extends in the direction of gravity.

In addition, when vapor generated during defrosting falls and when melting frost falls, water drops may rebound from the bottom surface of the case. Since the cover 230 closes the lower part of the first pipe 150 or the second pipe 170, the rebounding water drops may be prevented from being introduced into the first pipe 150 or the second pipe 170.

Figure 15:
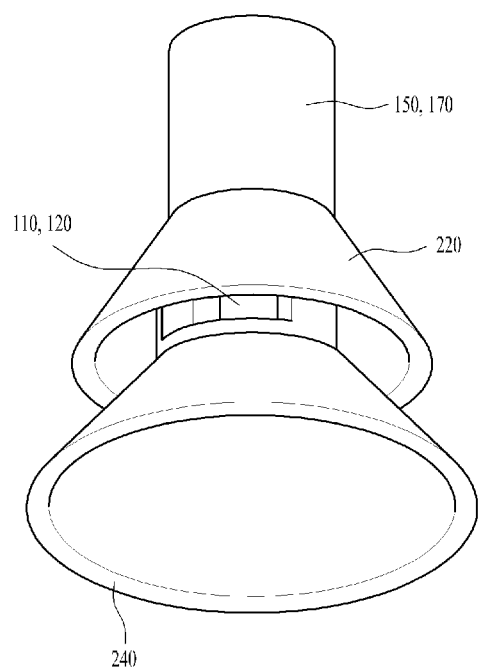

Referring to FIG. 15, the first expanded pipe part 220 is provided at the lower part thereof with a second expanded pipe part 240, the diameter of which gradually increases toward the lower end thereof. That is, two expanded pipe parts may be installed at the first pipe 150 or the second pipe 170 so as to be disposed at different heights.

In this case, an extension pipe, which extends from the first pipe 150 so as to have the same diameter as the upper side of the first expanded pipe part 220, is located in the first expanded pipe part 220, and the second expanded pipe part 240 is connected to the extension pipe.

The first through-hole 110 or the second through-hole 120 is formed in the extension pipe. The first through-hole 110 or the second through-hole 120 may be formed in the side surface of the extension pipe, rather than the lower part of the extension pipe. When viewed in the lateral direction, the first through-hole 110 or the second through-hole 120 may be hidden by the first expanded pipe part 220. Consequently, it is possible to prevent the defrost water from directly falling to the first through-hole 110 or the second through-hole 120 and from being introduced into the first pipe 150 or the second pipe 170.

A hole, through which air is guided to the first through-hole 110 or the second through-hole 120, is not formed in the lower part of the second expanded pipe part 240. The lower surface of the second expanded pipe part 240 is entirely closed. The lower end of the second expanded pipe part 240 extends so as to have a larger sectional area than the lower end of the first expanded pipe part 220. As a result, air in the case may not be directly introduced into the first through-hole 110 or the second through-hole 120. Consequently, it is possible for the differential pressure sensor 100 to more accurately measure static pressure than dynamic pressure caused by air flow.

In addition, when vapor generated during defrosting falls and when melting frost falls, water drops may rebound from the bottom surface of the case. Since the second expanded pipe part 240 closes the lower part of the first pipe 150 or the second pipe 170 and the lower part of the first through-hole 110 or the second through-hole 120, the water drops are prevented from being introduced into the first through-hole 110 or the second through-hole 120. Consequently, the probability of the first pipe 150 or the second pipe 170 becoming clogged and the differential pressure sensor 100 breaking down may be reduced.

Figure 16:
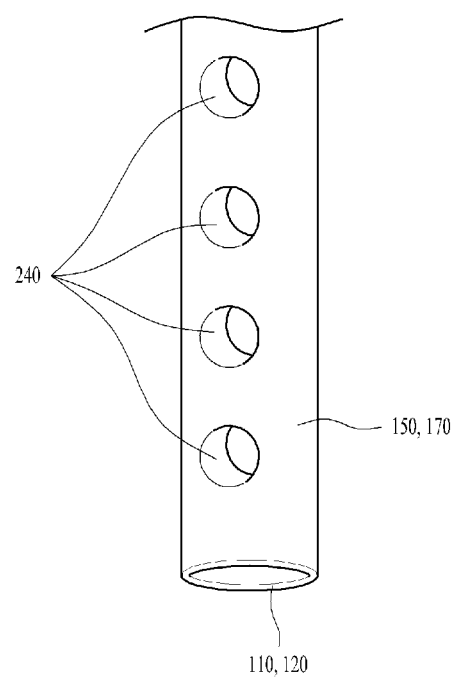

Referring to FIG. 16, a plurality of communication holes 240 may be formed in the first pipe 150 or the second pipe 170, and the communication holes 240 may be disposed so as to be perpendicular to the first through-hole 110 or the second through-hole 120.

The communication holes 240 may be arranged in a line in the vertical direction.

The communication holes 240 are formed in the side surface of the first pipe 150 or the second pipe 170. Even when water drops are formed inside the first pipe 150 or the second pipe 170, therefore, the water drops may be discharged out of the first pipe 150 or the second pipe 170 through the communication holes 240. Consequently, it is possible to prevent the first pipe 150 or the second pipe 170 from being clogged by the water drops. That is, the probability that the differential pressure sensor 100 breaks down may be reduced due to the communication holes 240, in addition to the first through-hole 110 or the second through-hole 120.

Figure 17:
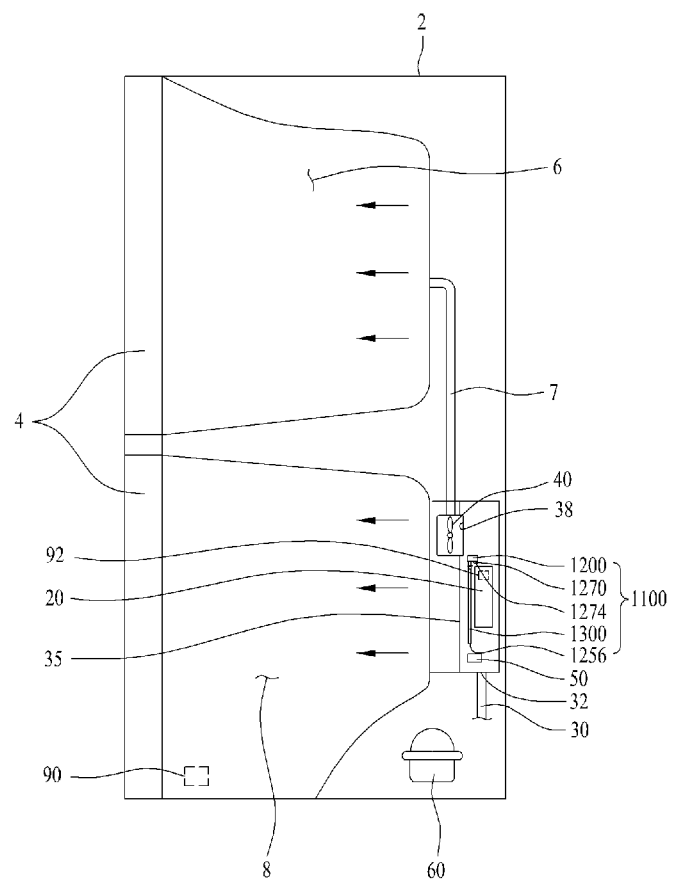
FIG. 17 is a side cut-away view showing a refrigerator according to an embodiment of the present invention.
Figure 18:
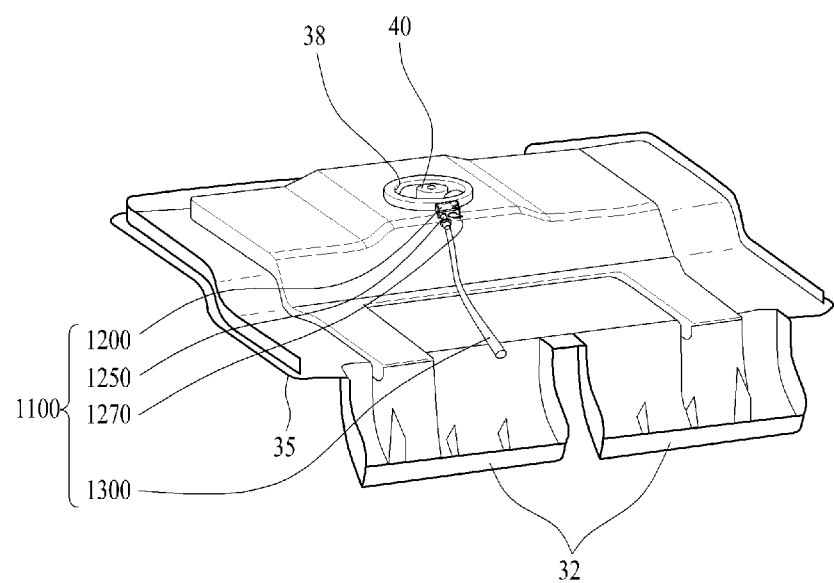
FIG. 18 is a view illustrating a principal part of FIG. 17.
Figure 19:
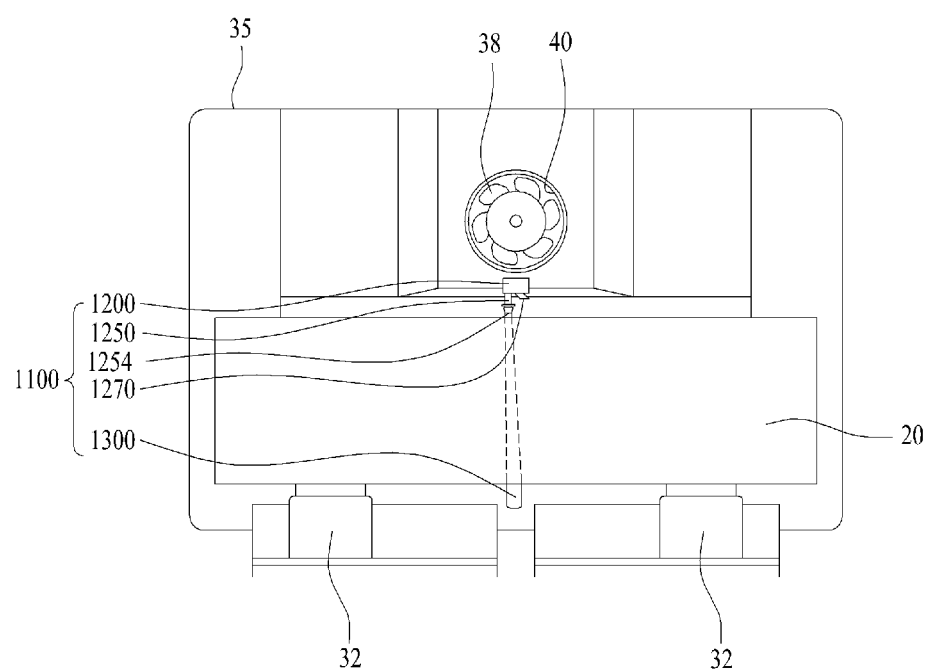
FIG. 19 is a plan view of FIG. 18.

FIG. 17 is a side cut-away view showing a refrigerator according to an embodiment of the present invention, FIG. 18 is a view illustrating a principal part of FIG. 17, and FIG. 19 is a plan view of FIG. 18. An evaporator is omitted from FIG. 18 for simplicity.

Hereinafter, a description will be given with reference to FIGS. 17 to 19.

The refrigerator includes a cabinet 2, having a plurality of storage compartments 6 and 8 defined therein, and doors 4 for opening and closing the storage compartments 6 and 8.

The storage compartments 6 and 8 include a first storage compartment 6 and a second storage compartment 8. The first storage compartment 6 and the second storage compartment 8 may constitute a refrigerating compartment and a freezing compartment, respectively. Alternatively, the first storage compartment 6 and the second storage compartment 8 may constitute a freezing compartment and a refrigerating compartment, respectively. In yet another alternative, both the first storage compartment 6 and the second storage compartment 8 may constitute refrigerating compartments or freezing compartments.

In the storage compartments 6 and 8 is provided a storage compartment temperature sensor 90 for measuring the temperature in the storage compartments 6 and 8. Alternatively, the temperature sensor 90 may be installed in each of the storage compartments 6 and 8 to individually measure the temperature in each storage compartment.

At the rear of the storage compartments is provided a case 35 for accommodating an evaporator 20.

The case 35 is provided with an outlet 38, through which air is supplied from the case 35 to the storage compartments, and with an inlet 32, through which air is supplied from the storage compartments into the case 35.

In the inlet 32 is provided an introduction pipe 30 for guiding air into the case 35. As a result, the storage compartments 6 and 8 may be connected to the case 35 in order to define an airflow path.

In the outlet 38 is provided a fan 40, which may enable air to flow from the case 35 to the storage compartments 6 and 8. The case 35 has a hermetically sealed structure, excluding the inlet 32 and the outlet 38. When the fan 40 is driven, therefore, air flows from the inlet 32 to the outlet 38.

The air having passed through the fan 40, i.e. cool air, may be supplied to the first storage compartment 6 through a duct 7 for guiding air to the first storage compartment 6. The air having passed through the fan 40 may also be supplied to the second storage compartment 8.

In the case 35 is accommodated the evaporator 20, which evaporates a refrigerant compressed by a compressor 60 in order to generate cool air. The air in the case 35 is cooled as the result of heat exchange with the evaporator 20.

Under the evaporator 20 is provided a heater for generating heat to defrost the evaporator 20. It is not necessary to install the heater 50 under the evaporator 20. It is sufficient to provide the heater in the case 35 in order to heat the evaporator 20.

An evaporator temperature sensor 92 may be provided at the evaporator 20 to measure the temperature of the evaporator 20. When the refrigerant, passing through the evaporator 20, is evaporated, the evaporator temperature sensor 92 may sense a low temperature. When the heater 50 is driven, the evaporator temperature sensor 92 may sense a high temperature.

The compressor 60 may be installed in a machinery compartment, which is provided in the cabinet 2, to compress the refrigerant that is supplied to the evaporator 20. The compressor 60 is installed outside the case 35.

The inlet 32 is located under the evaporator 20, and the outlet 38 is located above the evaporator 20. The outlet 38 is located higher than the evaporator 20, and the inlet 32 is located lower than the evaporator 20.

When the fan 40 is driven, therefore, air moves upwards in the case 35. The air, introduced into the inlet 32, undergoes heat exchange while passing through the evaporator 20, and is discharged out of the case 35 through the outlet 38.

A differential pressure sensor assembly 1100 is provided in the case 36. The differential pressure sensor assembly 1100 includes a differential pressure sensor for measuring pressure.

The differential pressure sensor assembly 1100 includes a housing 1200, in which a differential pressure sensor is provided. The housing 1200 is provided with a first communication pipe 1250 and a second communication pipe 1270. The first communication pipe 1250 and the second communication pipe 1270 extend downwards from the housing 1200.

The first communication pipe 1250 is formed so as to have a hollow shape, and a first through-hole 1254 is formed inside the first communication pipe. The second communication pipe 1270 is formed so as to have a hollow shape, and a second through-hole 1274 is formed inside the second communication pipe.

The second communication pipe 1270 extends above the evaporator 20, and therefore the second through-hole 1274 is disposed above the evaporator 20. That is, the second through-hole 1274 may be disposed between the evaporator 20 and the outlet 38.

The first communication pipe 1250 extends above the evaporator 20, but a tube 1300 may be coupled to the first communication pipe 1250. A communication hole 1256 is formed inside the tube 1300. The tube 1300 may extend below the evaporator 20, i.e. to a position between the evaporator 20 and the inlet 32. Consequently, the communication hole 1256 may be located under the evaporator 20 and the inlet 32.

The differential pressure sensor assembly 1100 may measure a difference in pressure between the upper side and the lower side of the evaporator 20 using a difference in pressure between air introduced from below the communication hole 1256 and air introduced from below the second through-hole 1274.

Air introduced through the communication hole 1256 may be directly introduced into the first through-hole 1254. That is, the differential pressure sensor assembly 1100 senses a difference in pressure between the air passing through the first through-hole 1254 and the air passing through the second through-hole 1274. A relatively low pressure is applied to the second through-hole 1274, which is a low-pressure part, and a relatively high pressure is applied to the first through-hole 1254, which is a high-pressure part. Consequently, the differential pressure sensor assembly 1100 senses a difference in pressure.

Particularly, when the fan 40 is driven, air flows in the case 35. Consequently, it is possible for the differential pressure sensor assembly 1100 to sense a difference in pressure.

Meanwhile, the second communication pipe 1270 extends so as to be adjacent to the upper side of the evaporator 20, and therefore it is possible to more accurately measure pressure at the upper side of the evaporator 20.

The tube 1300 may be made of a deformable material. When the tube 1300 extends to the lower part of the evaporator 20, therefore, the tube may be easily installed while being deformed so as not to contact the evaporator 20.

The housing 1200 may be disposed in the middle of the fan 40 in the leftward-rightward direction, whereby it is possible to accurately measure pressures at opposite sides of the evaporator 20. That is, the housing 1200 may be located in the middle of the fan 40, whereby it is possible to sense a difference in pressure depending on the distribution of pressure caused by air flow generated by the fan 40.

When the fan 40 is driven, the lower part of the evaporator 20 forms a relatively high pressure, since the air under the evaporator 20 is air that has not passed through the evaporator 20. In contrast, the upper part of the evaporator 20 forms a relatively low pressure due to the resistance of the evaporator 20, since the air above the evaporator 20 is air that has passed through the evaporator 20. As frost is formed on the evaporator 20, the volume of ice formed on the evaporator is increased, whereby air resistance is increased. As a result, a difference in pressure between the upper side and the lower side of the evaporator 20 is increased, and the differential pressure sensor assembly 1100 may sense the difference in pressure. In the case in which the sensed difference in pressure is greater than a predetermined value, it may be determined that frost is formed on the evaporator to such an extent that defrosting is necessary.

The differential pressure sensor assembly 1100 may measure a difference in pressure between the upper part of the evaporator 20 and the lower part of the evaporator 20 in order to sense whether frost is formed on the evaporator 20. Since the differential pressure sensor assembly 1100 measures a change in pressure caused by air passing through the evaporator 20 and flowing in the case 35, unlike conventional temperature sensors, it is possible to more accurately sense frost formed on the evaporator 20. Particularly, even in the case in which a relatively large amount of ice is formed on one side of the evaporator 20, it is possible to accurately sense frost formed on the evaporator 20.

Figure 20:
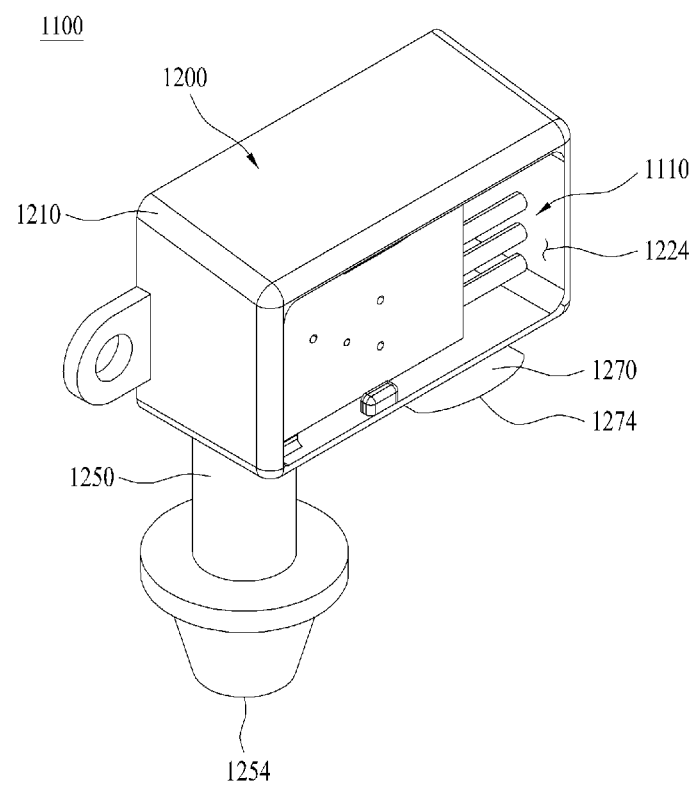
FIG. 20 is a view showing a differential pressure sensor assembly according to an embodiment of the present invention.

FIG. 20 is a view showing a differential pressure sensor assembly according to an embodiment of the present invention.

Referring to FIG. 20, a differential pressure sensor assembly 1100 according to an embodiment of the present invention includes a differential pressure sensor 1110 and a housing 1200, in which the differential pressure sensor 1110 is installed.

The housing 1200 may be fixed to one side wall of the case 35 such that the differential pressure sensor assembly 1100 is fixed in the case 35.

The housing 1200 includes a housing body 1210 having a space 1224 defined therein. The differential pressure sensor 1110 is accommodated in the space 1224.

In addition, the housing 1200 includes a first communication pipe 1250 and a second communication pipe 1270, which are provided at the housing body 1210 so as to extend therefrom.

The first communication pipe 1250 is provided with a hollow, which is a first through-hole 1254. In addition the second communication pipe 1270 is provided with a hollow, which is a second through-hole 1274.

Figure 21:
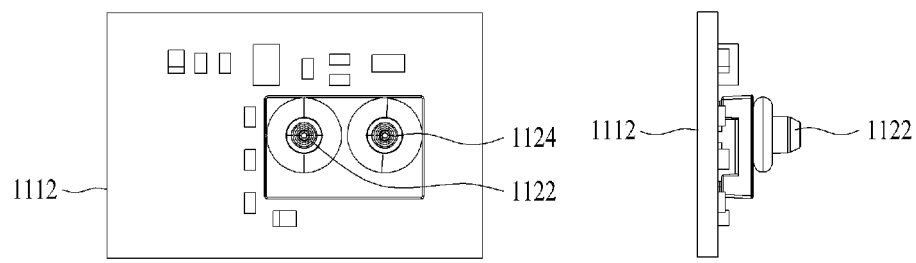
FIG. 21 is a view showing a differential pressure sensor according to an embodiment.
Figure 21:
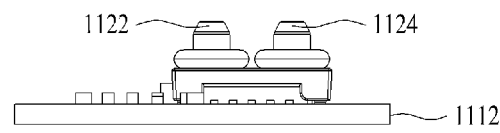

FIG. 21 is a view showing a differential pressure sensor according to an embodiment.

FIG. 21(*a*) is a front view of the differential pressure sensor 1110, FIG. 21(*b*) is a side view of the differential pressure sensor 1110, and FIG. 21(*c*) is a plan view of the differential pressure sensor 1110.

The differential pressure sensor 1110 includes a first port 1122, through which air is introduced, a second port 1124, through which the air, introduced through the first port 1122, is discharged, and a substrate 1112, on which the first port 1122 and the second port 1124 are installed.

That is, the first port 1122 may be disposed at a high-pressure part, the pressure of which is relatively high, and the second port 1124 may be disposed at a low-pressure part, the pressure of which is relatively low.

Since air moves from the high-pressure part to the low-pressure part, the air may be introduced through the first port 1122 and may be discharged through the second port 1124. On the substrate 1112 may be provided a temperature sensor, which may measure a change in the temperature of the air introduced through the first port 1122 and moving toward the second port 1124 in order to sense a difference in pressure between the first port 1122 and the second port 1124. Of course, it is possible to sense a difference in pressure using various methods.

Figure 22:
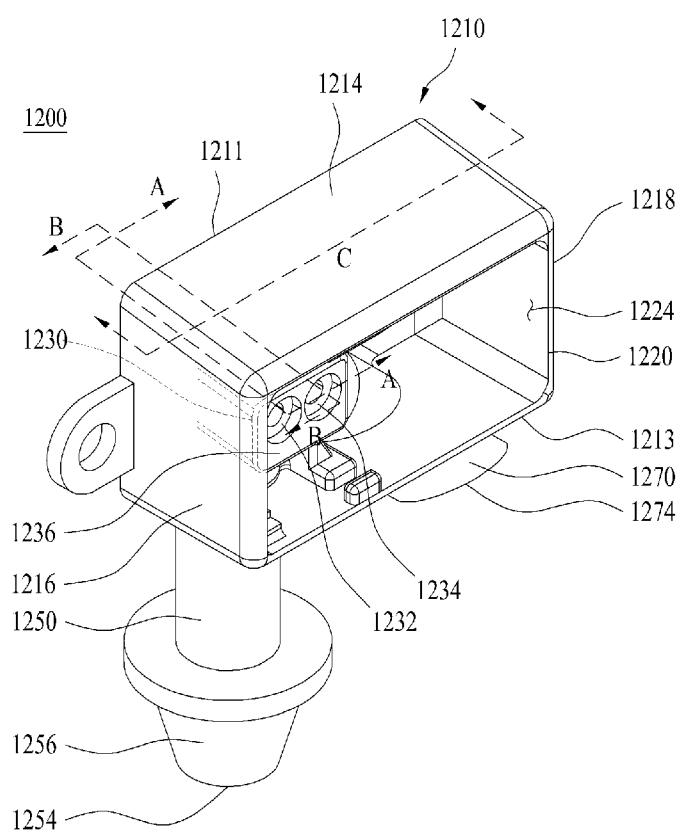
FIG. 22 is a perspective view of a housing.
Figure 23:
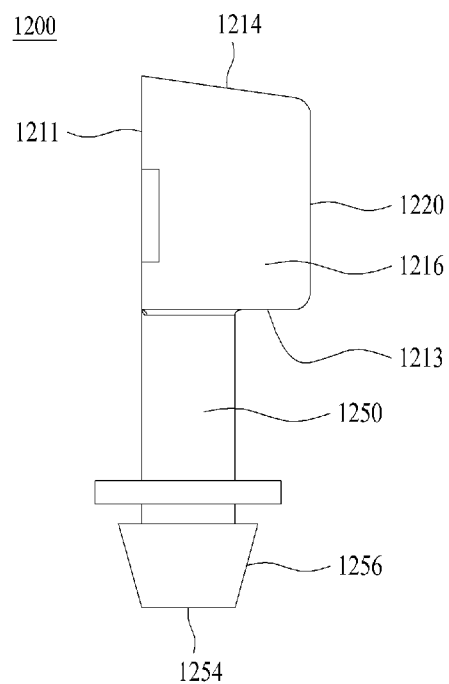
FIG. 23 is a side view of the housing.
Figure 24:
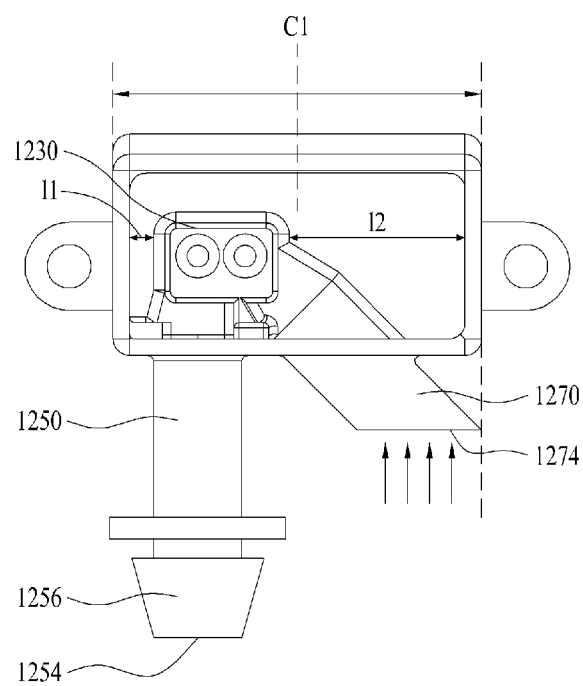
FIG. 24 is a front view of the housing.
Figure 25:
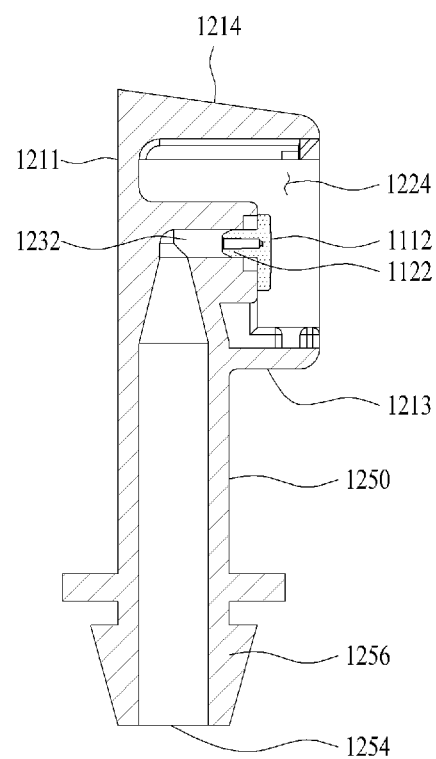
FIGS. 25 to 27 are sectional views of the housing.
Figure 26:
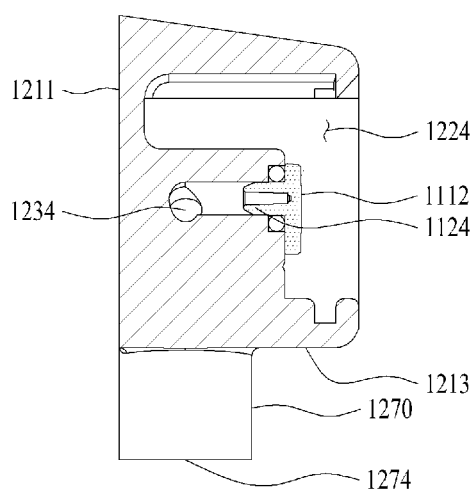
Figure 27:
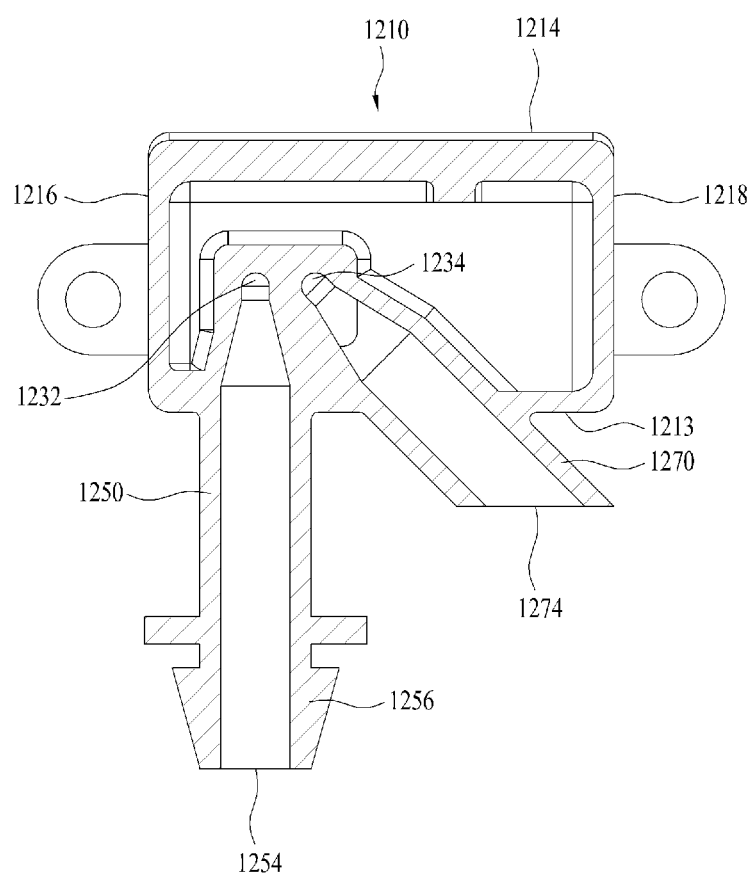

FIG. 22 is a perspective view of the housing, FIG. 23 is a side view of the housing, FIG. 24 is a front view of the housing, and FIGS. 25 to 27 are sectional views of the housing.

FIG. 25 is an A-A sectional view, FIG. 26 is a B-B sectional view, and FIG. 27 is a C-C sectional view.

The housing 1200 includes a first communication pipe 1250, which is provided in the housing body 1210 so as to communicate with the first port 1122. In addition, the housing 1200 includes a second communication pipe 1270, which is provided in the housing body 1210 so as to communicate with the second port 1124.

The housing body 1210 includes a front wall 1211, a left side wall 1216, a right side wall 1218, a ceiling 1214, and a bottom surface 1213. That is, the space 1224 may be defined by the front wall 1211, the left side wall 1216, the right side wall 1218, the ceiling 1214, and the bottom surface 1213.

The front wall 1211 may be fixed in the case 35 in the state of being in contact with one side wall of the case 35.

No rear wall is formed at the housing body 1210. The housing body is provided in the rear surface thereof with an opening 1220. The opening 1220 may be defined by edges of the left side wall 1216, the right side wall 1218, the ceiling 1214, and the bottom surface 1213.

The differential pressure sensor 1110 may be installed in the housing 1200 through the opening 1220. That is, the differential pressure sensor 1110 is inserted into the space 1224 through the opening 1220.

After the differential pressure sensor 1110 is inserted through the opening 1220, a molding solution may be injected into the space 1224. Since the differential pressure sensor 1110 is not exposed to external moisture due to the molding solution, electric leakage due to current supplied to the differential pressure sensor 1110 is prevented. The molding solution is hardened for a predetermined amount of time after being injected.

After the differential pressure sensor 1110 is installed, the space 1224 is filled with the molding solution, whereby no water drops are introduced into the space 1224. In addition, since the space 1224 is filled, water drops falling from the ceiling 1214 or water drops falling from the case 35 move along the molding solution and then fall below the housing 1200.

In addition, since the opening 1220 is located in the rear surface of the housing body 1110, water drops may move below the opening 1220 even when the water drops are formed in the opening 1220.

The ceiling 1214 is disposed so as to be inclined to the bottom surface 1213. Specifically, the ceiling 1214 may be disposed so as to be closer to the bottom surface 1214 in the rearward direction, whereby the rear of the ceiling 1214 may be lower than the front of the ceiling 1214.

Water generated from the ceiling 1214 may not remain on the ceiling 1214 but may fall from the housing 1200. The reason for this is that, if water remaining in the housing 1200 freezes, frost is formed in the housing 1200, and therefore the amount of cool air that is discharged through the outlet 39 is reduced, whereby cooling efficiency is reduced.

Since the front wall 1211 of the housing body 1210 is coupled to the case 35, however, the ceiling 1214 may be inclined toward the rear of the housing body 1210.

In the space 1224 is provided a location unit 1230, in which the differential pressure sensor 1110 is located. The location unit 1230 may protrude into the space 1224 in order to form a structure for fixing the differential pressure sensor 1110.

The location unit 1230 includes a location surface 1236, disposed in surface contact with the differential pressure sensor 1110, and a first hole 1232 and a second hole 1234, formed in the location surface 1236. The first hole 1232 communicates with the first communication pipe 1250, and the second hole 1234 communicates with the second communication pipe 1270.

That is, air introduced through the first through-hole 1254 is guided to the first hole 1232, and air discharged through the second hole 1234 is guided to the second through-hole 1274.

Meanwhile, a sealing member, such as an O-ring, may be provided at each of the first hole 1232 and the second hole 1234. Consequently, the first through-hole 1254 may communicate with the first hole 1232 without leakage, and the second through-hole 1274 may communicate with the second hole 1234 without leakage.

Since the location surface 1236 comes into surface contact with the differential pressure sensor 1110, the location surface 1236 may set the tilt angle of the differential pressure sensor 1110. That is, the differential pressure sensor 1110 may be coupled to the location surface 1236 in an inclined state.

The location surface 1236 may be disposed so as to be inclined to the bottom surface 1213. The location surface 1236 may be disposed so as to be perpendicular to the bottom surface 1213 such that the substrate 1112 of the differential pressure sensor 1110 is disposed so as to be perpendicular to the bottom surface 1213.

The first communication pipe 1250 and the second communication pipe 1270 extend from the same surface of the housing body 1210. Here, the same surface of the housing body 1210 may be the bottom surface 1213.

Meanwhile, the first communication pipe 1250 and the second communication pipe 1270 are not disposed parallel to each other but are disposed so as to be inclined to each other. The first communication pipe 1250 is coupled to the tube 1300, and the tube 1300 extends to the lower end of the evaporator 20. In contrast, the second communication pipe 1270 is disposed at the upper end of the evaporator 20. Consequently, the first communication pipe 1250 and the second communication pipe 1270 extend in different directions.

The first communication pipe 1250 extends so as to be perpendicular to the bottom surface 1213. In contrast, the second communication pipe 1270 extends so as to be inclined to the bottom surface 1213 by an angle smaller than a right angle. The second communication pipe 1270 may extend from the bottom surface 1213 toward the right side wall 1218.

Meanwhile, the first communication pipe 1250 and the second communication pipe 1270 extend from the location unit 1230. The directions in which the first communication pipe 1250 and the second communication pipe 1270 extend may be the same.

The first communication pipe 1250 may be provided at the outer circumferential surface thereof with a catching protrusion 1256. The catching protrusion 1256 may be tapered such that the section thereof gradually decreases downwards. When the tube 1300 is coupled to the first communication pipe 1250, therefore, the tube 1300 may be prevented from being separated from the catching protrusion 1256.

The outer circumferential surface of the first communication pipe 1250 may be inserted into the inner circumferential surface of the tube 1300, whereby the tube 1300 may be coupled to the first communication pipe 1250.

The second communication pipe 1270 may extend so as not to exceed the extension line of the right side wall 1218.

In the case in which the housing 1200 is manufactured by injection, it is necessary to manufacture a mold for manufacturing the housing 1200. If the second communication pipe 1270 extends rightwards further than the right side wall 1218, it is not easy to manufacture the mold. In addition, costs incurred to manufacture the mold are increased, whereby the cost of manufacturing the differential pressure sensor assembly 1100 is increased.

In this embodiment, therefore, the second communication pipe 1270 extends so as not to be perpendicular to the bottom surface 1213 but to be inclined to the bottom surface 1213, and extends so as not to exceed the right side wall 1218.

One end of the second communication pipe 1270 may have a surface cut in a direction parallel to the bottom surface 1213. Consequently, the sectional area of the second through-hole 1274, formed in the second communication pipe 1270, may be increased at the one end of the second communication pipe 1270.

Since the second communication pipe 1270 is disposed in an inclined state, the second through-hole 1274 and the second hole 1234 are formed at positions that are spaced apart from each other in the leftward-rightward direction.

When defrosting is performed using the heater 50, ice formed on the evaporator 20 may melt and change into vapor, which may rise.

Since the second through-hole 1274 is disposed at the upper side of the evaporator 20, as shown in FIG. 24, vapor rises vertically through the second through-hole 1274. At this time, the rising vapor cannot directly move to the second hole 1234, since the second communication pipe 1270 is disposed so as to be inclined.

If the second hole 1234 and the second through-hole 1274 are disposed so as to overlap each other when viewed from above, the rising vapor may be easily introduced into the second hole 1234 through the second through-hole 1274. As a result, the vapor may be supplied to the differential pressure sensor 1110, which may cause various problems. In order to prevent this, in this embodiment, the second communication pipe 1270 is disposed so as to be inclined such that the second hole 1234 and the second through-hole 1274 do not overlap each other when viewed from above, and is formed so as to extend sufficiently far.

The second communication pipe 1270 extends longer than the first communication pipe 1250. Since it is not desirable for one end of the second communication pipe 1270 to extend longer than the right side wall 1218, as described above, however, the location unit 1230 may be disposed so as to be biased to the left in the space 1224, as shown in FIG. 24. Consequently, the second communication pipe 1270 may extend such that the one end of the second communication pipe 1270 does not exceed the right side wall 1218.

The portion of the bottom surface 1213 between the first communication pipe 1250 and the second communication pipe 1270 may be biased to the side of the bottom surface 1213 at which the first communication pipe 1250 is located, rather than the middle part of the bottom surface 1213.

The distance L1 between the location unit 1230 and the left side wall 1216 may be smaller than the distance L2 between the location unit 1230 and the right side wall 1218.

The differential pressure sensor 1110 may also be disposed so as to be biased to the left in the space 1224 in order to secure space for extension of the length of the second communication pipe 1270.

As shown in FIG. 27, the first through-hole 1254, formed in the first communication pipe 1250, may be larger than the first hole 1232, and the first communication pipe 1250 may be expanded at the portion thereof that abuts the first hole 1232.

The second through-hole 1274, formed in the second communication pipe 1270, may be larger than the second hole 1234, and the second communication pipe 1270 may be expanded at the portion thereof that abuts the second hole 1234.

The first port 1112 is coupled to the first hole 1232, and the second port 1114 is coupled to the second hole 1234. The section of each of the first port 1112 and the second port 1114 is relatively small, and the section of each of the first through-hole 1254 and the second through-hole 1274 is relatively large.

Water drops may be easily formed in the first through-hole 1254 and the second through-hole 1274, since the first through-hole and the second through-hole are exposed in the case 35. In order to discharge the water drops to the outside, it is necessary to increase the size of each of the first through-hole 1254 and the second through-hole 1274 to such an extent that the water drops can be discharged from the first through-hole and the second through-hole. The reason for this is that, if the section of each of the first through-hole and the second through-hole is small, the water drops may easily rise due to a capillary phenomenon, and may not fall.

Figure 28:
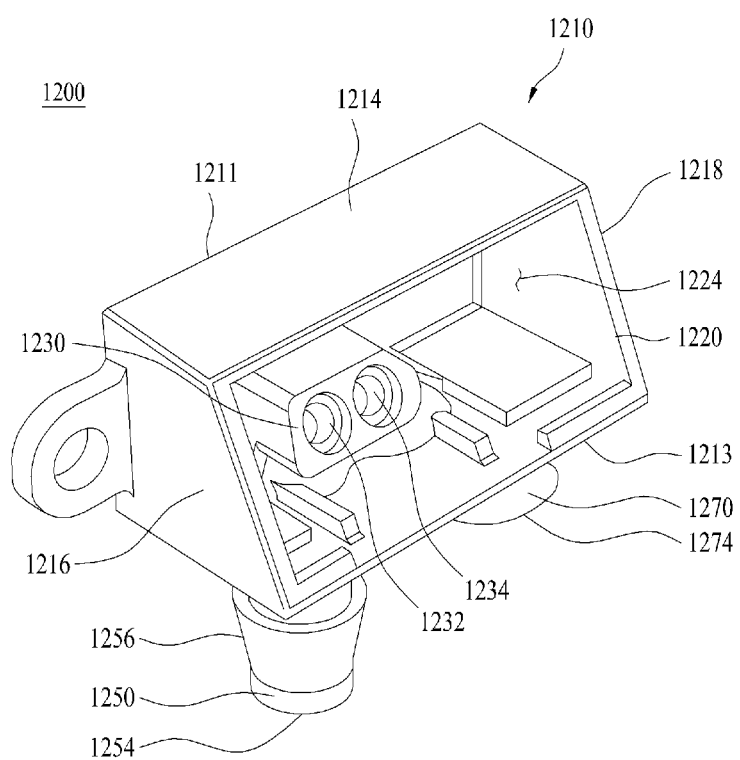
FIG. 28 is a view showing a differential pressure sensor assembly according to another embodiment of the present invention.
Figure 29:
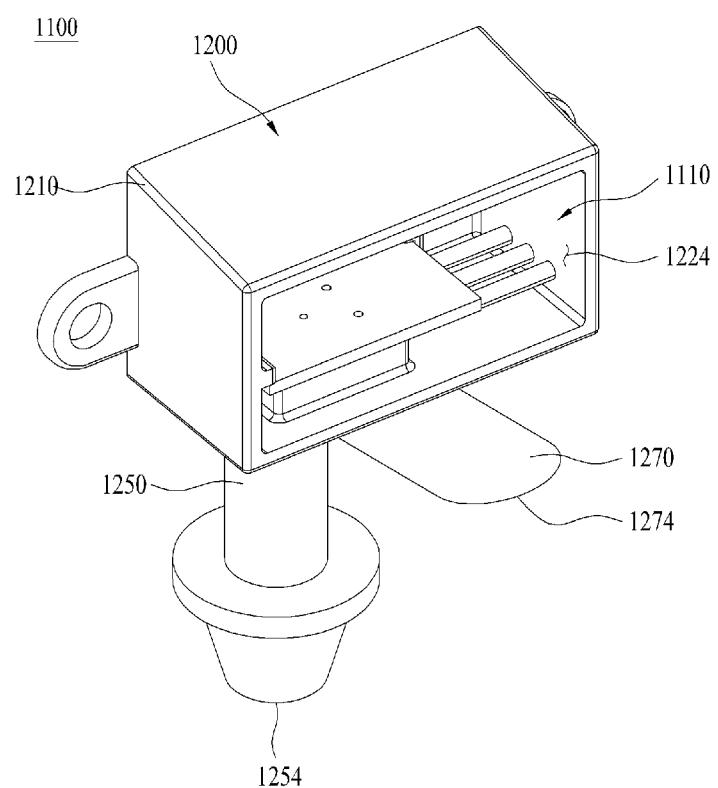
FIG. 29 is a view showing a differential pressure sensor assembly according to a further embodiment of the present invention.
Figure 30:
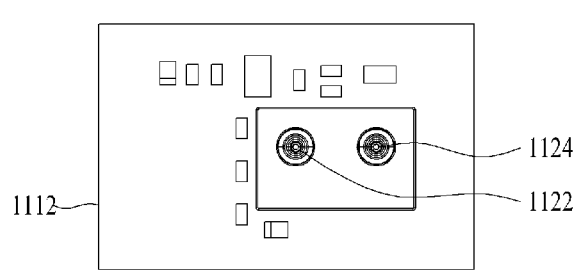
FIG. 30 is a view showing a differential pressure sensor according to a further embodiment.
Figure 30:
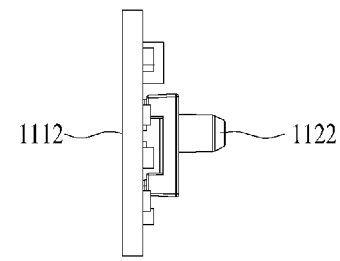
Figure 30:
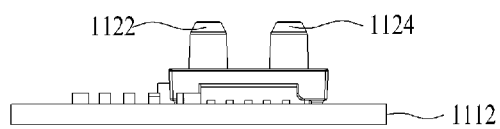
Figure 31:
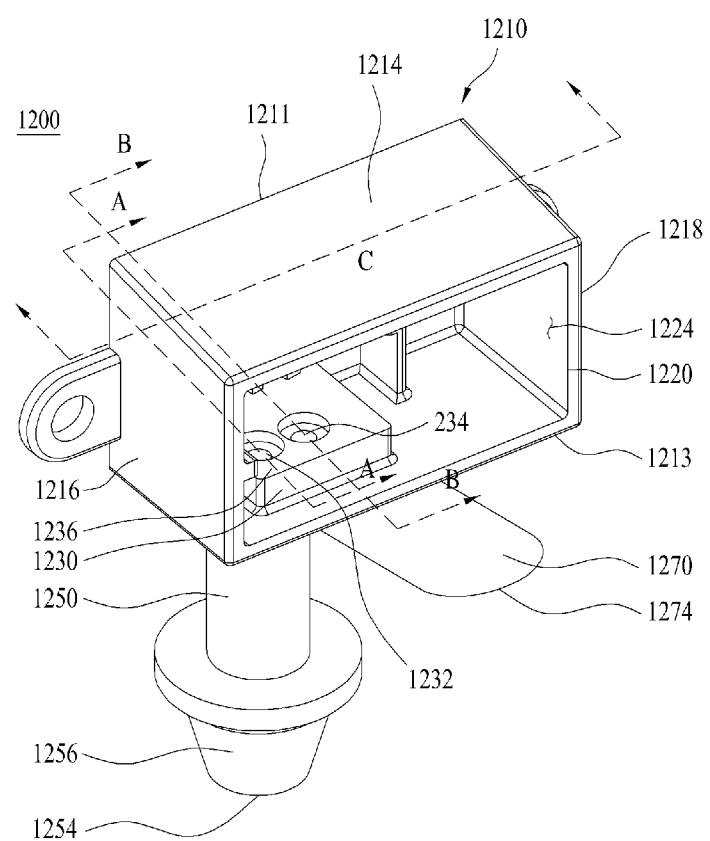
FIG. 31 is a perspective view of a housing shown in FIG. 29.
Figure 32:
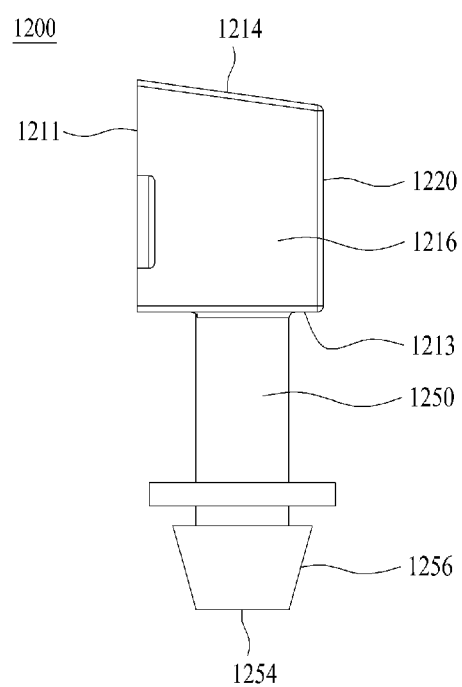
FIG. 32 is a side view of the housing shown in FIG. 29.
Figure 33:
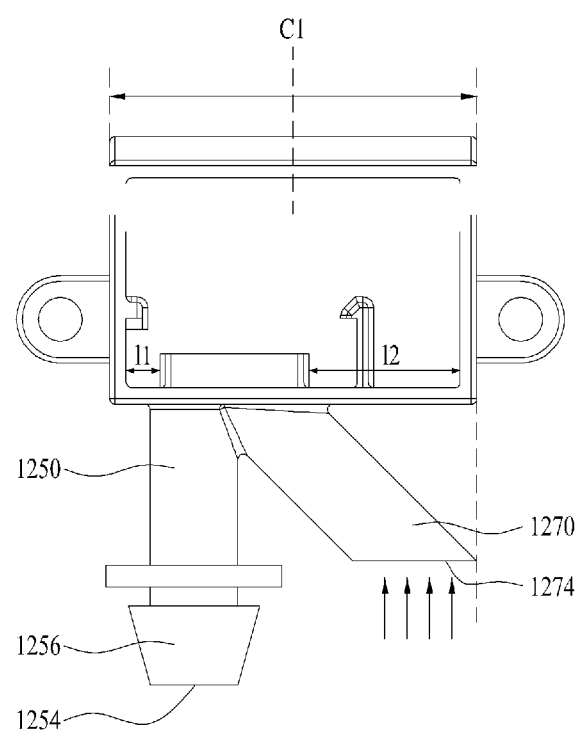
FIG. 33 is a front view of the housing shown in FIG. 29.
Figure 34:
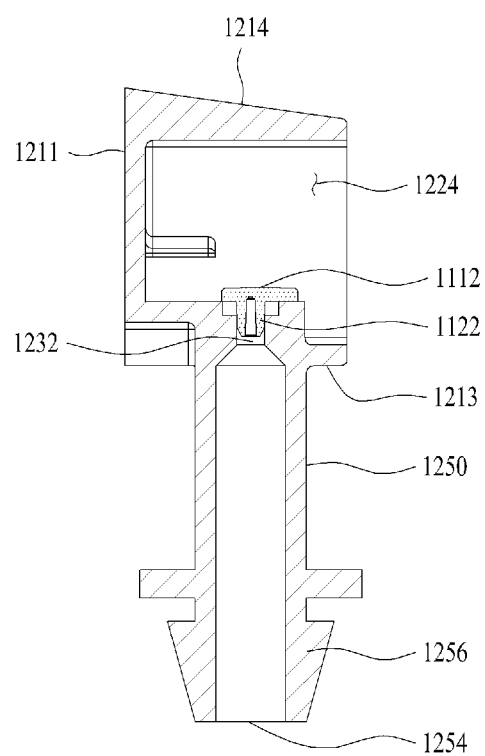
FIGS. 34 to 36 are sectional views of the housing shown in FIG. 29.
Figure 35:
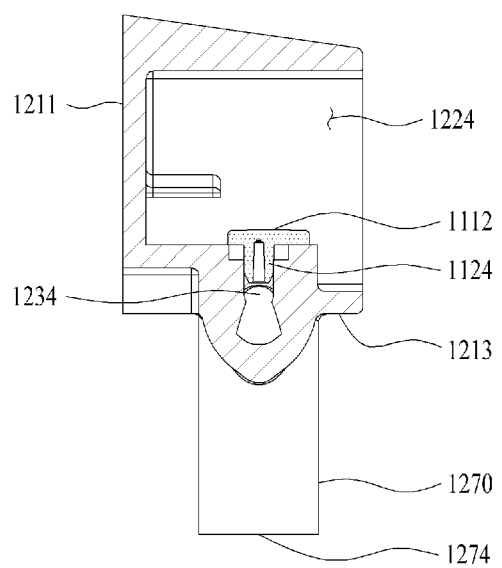
Figure 36:
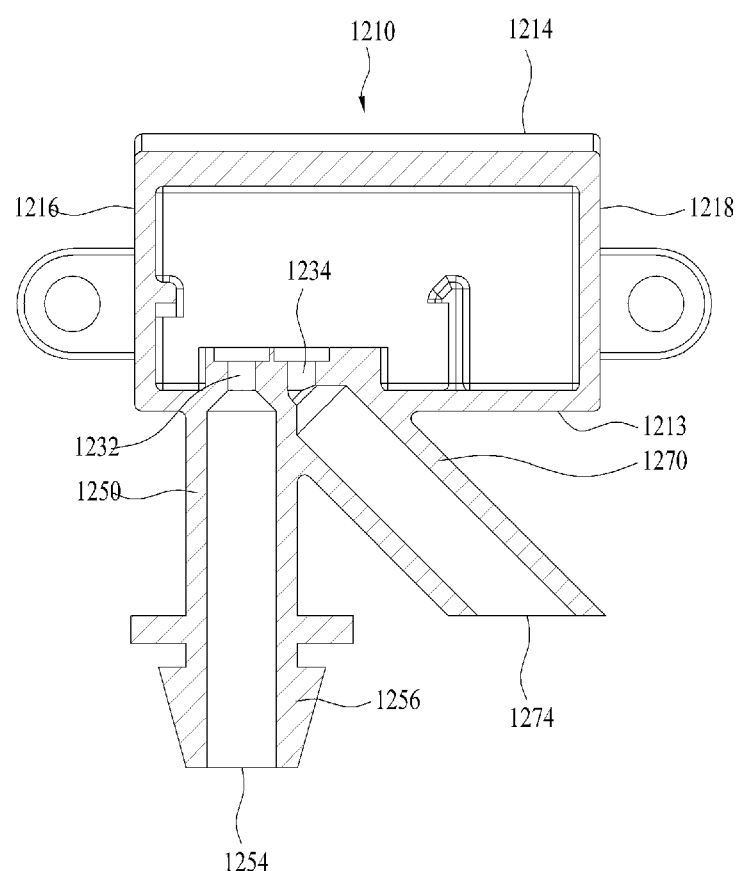

FIG. 28 is a view showing a differential pressure sensor assembly according to another embodiment of the present invention.

In this embodiment, the differential pressure sensor 1110 is disposed so as to be inclined to the bottom surface 1213 without being perpendicular thereto, unlike the previous embodiment. This embodiment is identical to the previous embodiment except that the installation angle of the differential pressure sensor 1110 is changed, and therefore a duplicate description of the same elements will be omitted.

This embodiment is different from the previous embodiment in that the angle at which the first port 1122 and the first communication pipe 1250 communicate with each other and the angle at which the second port 1124 and the second communication pipe 1270 communicate with each other approximate a right angle.

In addition, the depth of the first hole 1232 and the second hole 1234 may be increased in order to secure the depth of the first port 1122 and the second port 1124, which are coupled to the location unit 1230. In addition, the direction in which the first hole 1232 and the second hole 1234 are formed may extend in a direction that is parallel to the bottom surface 1213 in order to achieve easy insertion of the first port 1122 and the second port 1124.

FIGS. 29 to 36 are views showing a further embodiment of the present invention.

A description of the previous embodiment of the present invention may be equally applied to the embodiment of FIGS. 29 to 36. However, this embodiment is different from the previous embodiment in that the substrate 1112 is disposed parallel to the bottom surface 1213 of the housing body.

Therefore, a duplicate description of the elements of this embodiment to which the description of the previous embodiment of the present invention is equally applied will be omitted, and only different elements will be described. The description of the previous embodiment of the present invention is equally applied to the same elements of this embodiment of the present invention in order to describe this embodiment.

In this embodiment, the location surface 1236 is disposed parallel to the bottom surface 1213. The location surface 1236 may be provided so as to be parallel to the bottom surface 1213 such that the substrate 1112 of the differential pressure sensor 1110 is disposed parallel to the bottom surface 1213. The location surface 1236 may adjust the position and installation angle of the differential pressure sensor 1110 while being in surface contact with the differential pressure sensor 1110.

In this embodiment of the present invention, the first port 1122 is disposed parallel to the first communication pipe 1250, but the second port 1124 is disposed so as not to be parallel to the second communication pipe 1270.

Since the first port 1122 and the first communication pipe 1250 are parallel to each other, air introduced through the first through-hole 1254, formed in the first communication pipe 1250, may be introduced into the first port 1122 while moving vertically. Consequently, it is not necessary to bend the flow path along which air moves in order to reduce the flow-path resistance of air moving between the first communication pipe 1250 and the first port 1122.

The second port 1124 and the second communication pipe 1270 are not parallel to each other. However, air discharged from the second port 1124 may be discharged through the second communication pipe 1270 even though the air is not redirected 90 degrees or more. Consequently, it is possible to reduce the resistance to air discharged through the second port 1124, compared to the case in which the angle between the direction in which air moves in the second port 1124 and the direction in which air moves in the second communication pipe 1270 is 90 degrees or more. In addition, the flow path along which air moves may be easily designed, whereby it is possible to easily design and manufacture the housing 1200.

The present invention is not limited to the above embodiments, and can be modified by those skilled in the art to which the present invention pertains, as can be seen from the scope of the appended claims. Such modified embodiments fall within the scope of the present invention.

The following is the first list of embodiments.

1. A method of controlling a refrigerator comprising: sensing a differential pressure using a differential pressure sensor for measuring a difference in pressure between a first through-hole, disposed between an inlet, through which air is introduced from a storage compartment, and an evaporator, and a second through-hole, disposed between an outlet, through which air is discharged to the storage compartment, and the evaporator; and determining that a pipe of the differential pressure sensor is clogged when the differential pressure is less than a set value.

2. The method according to the first embodiment, further comprising:

calculating an average of differential pressures before the step of determining that the pipe is clogged, wherein at the step of determining that the pipe is clogged, the average of differential pressures is compared with the set value.

3. The method according to the second embodiment, further comprising determining whether the average of differential pressures is less than a value obtained by subtracting a reference value from a maximum average (a first clogging determination step).

4. The method according to the third embodiment, wherein the reference value is less than a first set pressure, based on which it is determined that defrosting of the evaporator is necessary.

5. The method according to the fourth embodiment, wherein the reference value is equal to or less than ⅓ of the first set pressure.

6. The method according to the second embodiment, further comprising updating a maximum average with the average of differential pressures when the average of differential pressures is greater than the maximum average.

7. The method according to the second embodiment, further comprising determining whether the average of differential pressures is less than a minimum average (a second clogging determination step).

8. The method according to the seventh embodiment, wherein the minimum average is a differential pressure value measured in a state in which no frost is formed on the evaporator.

9. The method according to the first embodiment, wherein
a condition for defrosting the evaporator is changed upon determining that the pipe of the differential pressure sensor is clogged.

10. The method according to the ninth embodiment, wherein
the changed condition is used to
determine whether a predetermined amount of time has elapsed since a compressor was driven.

11. The method according to the ninth embodiment, wherein
the changed condition is used to
determine whether a specific time has elapsed since a door opened the storage compartment.

12. The method according to the first embodiment, further comprising
determining whether a fan for generating air flow to supply cool air to the storage compartment is driven
before the step of sensing the differential pressure.

13. The method according to the first embodiment, further comprising
determining that a door for opening and closing the storage compartment is closed
before the step of sensing the differential pressure.

14. The method according to the thirteenth embodiment, further comprising
determining whether a predetermined amount of time has elapsed since the door was closed.

15. The method according to the first embodiment, further comprises
measuring a temperature of the evaporator
at a step of performing defrosting.

16. The method according to the first embodiment, further comprising
determining whether a period of measuring the differential pressure using the differential pressure sensor is satisfied
before the step of sensing the differential pressure.

17. A refrigerator comprising: a cabinet having a storage compartment defined therein;
a door for opening and closing the storage compartment;
a case having therein an inlet, through which air is introduced from the storage compartment, and an outlet, through which air is discharged to the storage compartment;
a fan for generating a flow of air that is introduced through the inlet and discharged through the outlet;
a differential pressure sensor provided in the case; and
a controller for determining that a pipe of the differential pressure sensor is clogged when a differential pressure sensed by the differential pressure sensor is less than a set value.

18. The refrigerator according to the seventeenth embodiment, wherein
the controller calculates an average of differential pressures sensed by the differential pressure sensor and compares the average with the set value.

19. The refrigerator according to the eighteenth embodiment, wherein
the controller
determines that the pipe of the differential pressure sensor is clogged when the average of differential pressures is less than a value obtained by subtracting a reference value from a maximum average.

20. The refrigerator according to the nineteenth embodiment, wherein
the reference value is less than a first set pressure, based on which it is determined that defrosting of an evaporator provided in the case is necessary.

21. The refrigerator according to the eighteenth embodiment, wherein
the controller
determines that the pipe of the differential pressure sensor is clogged when the average of differential pressures is less than a minimum average.

22. The refrigerator according to the twenty-first embodiment, wherein
the minimum average is a differential pressure value measured in a state in which no frost is formed on the evaporator.

23. The refrigerator according to the eighteenth embodiment, wherein
the controller
sets a defrosting time of the evaporator without using the differential pressure measured by the differential pressure sensor upon determining that the pipe of the differential pressure sensor is clogged.

24. The refrigerator according to the twenty-third embodiment, wherein
the controller
performs control to drive a heater in order to defrost the evaporator when a predetermined amount of time elapses after a compressor is driven.

25. The refrigerator according to the twenty-third embodiment, wherein
the controller
performs control to drive a heater in order to defrost the evaporator when a specific time elapses after the door opens the storage compartment.

26. The refrigerator according to the seventeenth embodiment, wherein
the differential pressure sensor comprises:
a first through-hole disposed between the evaporator and the inlet;
a second through-hole disposed between the evaporator and the outlet; and
a main body for interconnecting the first through-hole and the second through-hole, and wherein
the differential pressure sensor senses a difference in pressure between air passing through the first through-hole and air passing through the second through-hole.

The following is the second list of embodiments.

1. A refrigerator comprising: a cabinet having a storage compartment defined therein;
a door for opening and closing the storage compartment;
a case having therein an inlet, through which air is introduced from the storage compartment, and an outlet, through which air is discharged to the storage compartment;
an evaporator provided in the case for exchanging heat with air to supply cool air;
a heater provided in the case;
a fan for generating a flow of air that is introduced through the inlet and discharged through the outlet;
a sensor provided in the case; and
a controller for performing control to drive the heater based on information sensed by the sensor in order to defrost the evaporator.

2. The refrigerator according to the first embodiment, wherein
the sensor comprises a flow sensor.

3. The refrigerator according to the second embodiment, wherein
the flow sensor is provided in the inlet to measure a flow rate of air that is introduced into the case when the fan is driven.

4. The refrigerator according to the second embodiment, wherein
the flow sensor is provided in the outlet to measure a flow rate of air that is introduced into the case when the fan is driven.

5. The refrigerator according to the second embodiment, wherein
the controller
performs control to drive the heater in a case in which an amount of moving air, measured by the flow sensor, is reduced to a set value or less when the fan is driven.

6. The refrigerator according to the first embodiment, wherein
the sensor comprises a differential pressure sensor, wherein
the differential pressure sensor comprises:
a first through-hole disposed between the evaporator and the inlet;
a second through-hole disposed between the evaporator and the outlet; and
a main body for interconnecting the first through-hole and the second through-hole, and wherein
the differential pressure sensor senses a difference in pressure between air passing through the first through-hole and air passing through the second through-hole.

7. The refrigerator according to the sixth embodiment, wherein
the outlet is disposed higher than the evaporator, and
the inlet is disposed lower than the evaporator.

8. The refrigerator according to the seventh embodiment, wherein
the main body comprises:
a first pipe having the first through-hole formed therein;
a second pipe having the second through-hole formed therein; and
a connection member for interconnecting the first pipe and the second pipe.

9. The refrigerator according to the eighth embodiment, wherein
the connection member is disposed higher than the evaporator.

10. The refrigerator according to the ninth embodiment, wherein
the first pipe and the second pipe extend higher than the evaporator.

11. The refrigerator according to the sixth embodiment, further comprising:
a door switch for sensing whether the door opens and closes the storage compartment, wherein
the controller performs control such that the differential pressure sensor senses the difference in pressure when the door switch senses that the door to the storage compartment is closed.

12. The refrigerator according to the sixth embodiment, wherein
when the fan is driven,
the controller performs control such that the differential pressure sensor senses the difference in pressure.

13. The refrigerator according to the sixth embodiment, further comprising:
a timer for sensing an elapsed time, wherein
the controller performs control such that the differential pressure sensor senses the difference in pressure when a time set by the timer elapses.

14. The refrigerator according to the first embodiment, further comprising:
an evaporator temperature sensor for measuring a temperature of the evaporator, wherein
the controller performs control to stop driving the heater in a case in which the temperature of the evaporator increases to a set temperature when defrosting is performed.

15. A method of controlling a refrigerator comprising:
sensing a differential pressure using a differential pressure sensor for measuring a difference in pressure between a first through-hole, disposed between an inlet, through which air is introduced from a storage compartment, and an evaporator, and a second through-hole, disposed between an outlet, through which air is discharged to the storage compartment, and the evaporator; and
driving a heater to perform defrosting of the evaporator when the differential pressure is greater than a set pressure.

16. The method according to the fifteenth embodiment, further comprising
determining whether a fan for generating air flow to supply cool air to the storage compartment is driven
before the step of sensing the differential pressure.

17. The method according to the fifteenth embodiment, further comprising
determining that a door for opening and closing the storage compartment is closed
before the step of sensing the differential pressure.

18. The method according to the seventeenth embodiment, further comprising
determining whether a predetermined amount of time has elapsed since the door was closed.

19. The method according to the fifteenth embodiment, further comprising
measuring a temperature of the evaporator
at the step of performing defrosting.

20. The method according to the fifteenth embodiment, further comprising
determining whether a period of measuring the differential pressure using the differential pressure sensor is satisfied
before the step of sensing the differential pressure.

21. The method according to the fifteenth embodiment, wherein
the differential pressure is an average of differential pressures.

The following is the third list of embodiments.

1. A method of controlling a refrigerator comprising:
sensing a differential pressure using a differential pressure sensor for measuring a difference in pressure between a first through-hole, disposed between an inlet, through which air is introduced from a storage compartment, and an evaporator, and a second through-hole, disposed between an outlet, through which air is discharged to the storage compartment, and the evaporator;
driving a heater to perform defrosting of the evaporator when the differential pressure is greater than a first set pressure; and
changing the first set pressure to a set value when the differential pressure remeasured by the differential pressure sensor is greater than a second set pressure after defrosting is finished.

2. The method according to the first embodiment, wherein
the first set pressure is higher than the second set pressure.

3. The method according to the first embodiment, wherein
the changing the first set pressure to the set value is reducing the first set pressure.

4. The method according to the third embodiment, wherein
the reduced first set pressure is equal to or higher than the second set pressure.

5. The method according to the first embodiment, wherein when the evaporator is defrosted again, defrosting is performed in a case in which the differential pressure is greater than the changed first set pressure.

6. The method according to the first embodiment, wherein the step of changing the first set pressure to the set value comprises changing a first set temperature, at which driving of the heater is stopped when the evaporator is defrosted, to a set value.

7. The method according to the sixth embodiment, wherein the changing the first set temperature to the set value is increasing the first set temperature.

8. The method according to the first embodiment, further comprising determining whether the compressor is driven after the step of performing defrosting.

9. The method according to the first embodiment, further comprising determining whether a temperature of the storage compartment reaches a second set temperature and, upon determining that the temperature of the storage compartment does not reach the second set temperature, sensing the differential pressure after the step of changing the first set pressure to the set value.

10. The method according to the first embodiment, further comprising maintaining the first set pressure as an initial value when the differential pressure remeasured by the differential pressure sensor is less than the second set pressure after defrosting is finished.

11. The method according to the tenth embodiment, wherein at the step of maintaining the first set pressure as the initial value, maintaining a first set temperature, at which driving of the heater is stopped when the evaporator is defrosted, as an initial value.

12. The method according to the first embodiment, wherein the step of changing the first set pressure to the set value is performed in a cycle in which a compressor starts to be initially driven after defrosting is finished.

13. The method according to the first embodiment, further comprising determining whether a fan for generating air flow to supply cool air to the storage compartment is driven before the step of sensing the differential pressure.

14. The method according to the first embodiment, further comprising determining that a door for opening and closing the storage compartment is closed before the step of sensing the differential pressure.

15. The method according to the fourteenth embodiment, further comprising determining whether a predetermined amount of time has elapsed since the door was closed.

16. The method according to the first embodiment, further comprising measuring a temperature of the evaporator at the step of performing defrosting.

17. The method according to the first embodiment, further comprising determining whether a period of measuring the differential pressure using the differential pressure sensor is satisfied before the step of sensing the differential pressure.

18. A refrigerator comprising: a cabinet having a storage compartment defined therein;

a door for opening and closing the storage compartment;

a case having therein an inlet, through which air is introduced from the storage compartment, and an outlet, through which air is discharged to the storage compartment;

an evaporator provided in the case for exchanging heat with air to supply cool air;

a heater provided in the case;

a fan for generating a flow of air that is introduced through the inlet and discharged through the outlet;

a sensor provided in the case; and a controller for performing control to drive the heater based on information sensed by the sensor in order to defrost the evaporator, wherein the controller determines whether residual ice remains on the evaporator based on the information sensed by the sensor after defrosting performed by the heater is finished.

19. The refrigerator according to the eighteenth embodiment, wherein the sensor comprises a flow sensor.

20. The refrigerator according to the nineteenth embodiment, wherein the flow sensor is provided in the inlet to measure a flow rate of air that is introduced into the case when the fan is driven.

21. The refrigerator according to the nineteenth embodiment, wherein the flow sensor is provided in the outlet to measure a flow rate of air that is introduced into the case when the fan is driven.

22. The refrigerator according to the nineteenth embodiment, wherein the controller changes a set value of a flow rate of air for defrosting the evaporator upon determining that residual ice remains on the evaporator.

23. The refrigerator according to the nineteenth embodiment, wherein the controller changes a set value of a temperature of the evaporator for finishing defrosting of the evaporator upon determining that residual ice remains on the evaporator.

24. The refrigerator according to the eighteenth embodiment, wherein the sensor comprises a differential pressure sensor, wherein the differential pressure sensor comprises:

a first through-hole disposed between the evaporator and the inlet;

a second through-hole disposed between the evaporator and the outlet; and a main body for interconnecting the first through-hole and the second through-hole, and wherein the differential pressure sensor senses a difference in pressure between air passing through the first through-hole and air passing through the second through-hole.

25. The refrigerator according to the twenty-fourth embodiment, wherein the controller performs control to drive the heater in order to perform defrosting of the evaporator when the differential pressure measured by the differential pressure sensor reaches a first set pressure.

26. The refrigerator according to the twenty-fifth embodiment, wherein the controller performs control to reduce the first set pressure when the differential pressure measured by the differential pressure sensor is greater than a second set pressure after defrosting is finished.

27. The refrigerator according to the twenty-sixth embodiment, wherein
the first set pressure is greater than the second set pressure.

28. The refrigerator according to the twenty-fifth embodiment, wherein
the controller performs control to heat the evaporator to a higher temperature at a time of performing defrosting when the differential pressure measured by the differential pressure sensor is greater than a second set pressure after defrosting is finished.

29. The refrigerator according to the twenty-fifth embodiment, wherein
the controller performs control to increase a driving time of the heater at a time of performing defrosting when the differential pressure measured by the differential pressure sensor is greater than a second set pressure after defrosting is finished.

The following is the fourth list of embodiments.

1. A differential pressure sensor assembly comprising: a differential pressure sensor comprising a first port, through which air is introduced, a second port, through which the air, introduced through the first port, is discharged, and a substrate, on which the first port and the second port are installed; and
a housing, in which the differential pressure sensor is installed, wherein
the housing comprises:
a housing body having a space defined therein, the differential pressure sensor being accommodated in the space;
a first communication pipe provided in the housing body, the first communication pipe communicating with the first port; and
a second communication pipe communicating with the second port, and wherein
the first communication pipe and the second communication pipe are not disposed parallel to each other but are disposed so as to be inclined to each other.

2. The differential pressure sensor assembly according to the first embodiment, wherein
the first communication pipe and the second communication pipe extend from a same surface of the housing body.

3. The differential pressure sensor assembly according to the first embodiment, wherein
the first communication pipe and the second communication pipe are provided at a bottom surface of the housing body.

4. The differential pressure sensor assembly according to the first embodiment, wherein
the space
is defined by a front wall, a left side wall, a right side wall, a ceiling, and a bottom surface of the housing body.

5. The differential pressure sensor assembly according to the fourth embodiment, wherein
the housing comprises an opening formed in a rear surface of the housing body, and
the opening is defined by edges of the left side wall, the right side wall, the ceiling, and the bottom surface.

6. The differential pressure sensor assembly according to the fourth embodiment, wherein
the ceiling is disposed so as to be inclined to the bottom surface.

7. The differential pressure sensor assembly according to the sixth embodiment, wherein
the ceiling is disposed so as to be closer to the bottom surface in a rearward direction.

8. The differential pressure sensor assembly according to the fourth embodiment, wherein
the first communication pipe extends so as to be perpendicular to the bottom surface.

9. The differential pressure sensor assembly according to the fourth embodiment, wherein
the second communication pipe extends so as to be inclined to the bottom surface by an angle smaller than a right angle.

10. The differential pressure sensor assembly according to the ninth embodiment, wherein
the second communication pipe extends from the bottom surface toward the right side wall.

11. The differential pressure sensor assembly according to the ninth embodiment, wherein
the second communication pipe extends so as not to exceed an extension line of the right side wall.

12. The differential pressure sensor assembly according to the ninth embodiment, wherein
one end of the second communication pipe has a surface cut in a direction parallel to the bottom surface.

13. The differential pressure sensor assembly according to the fourth embodiment, wherein
a second hole, formed in a portion of the second communication pipe that communicates with the space, and a second through-hole, formed in one end of the second communication pipe, are disposed at positions that are spaced apart from each other when viewed from above.

14. The differential pressure sensor assembly according to the fourth embodiment, wherein
a portion of the bottom surface between the first communication pipe and the second communication pipe is biased to one side of the bottom surface at which the first communication pipe is located, rather than a middle part of the bottom surface.

15. The differential pressure sensor assembly according to the fourth embodiment, wherein
a location unit, in which the differential pressure sensor is located, is provided in the space.

16. The differential pressure sensor assembly according to the fifteenth embodiment, wherein
the location unit comprises:
a location surface disposed in surface contact with the differential pressure sensor; and
a first hole and a second hole formed in the location surface, and wherein
the first hole communicates with the first communication pipe, and
the second hole communicates with the second communication pipe.

17. The differential pressure sensor assembly according to the sixteenth embodiment, wherein
the location surface is disposed so as to be inclined to the bottom surface.

18. The differential pressure sensor assembly according to the sixteenth embodiment, wherein
a first through-hole, formed in the first communication pipe, is larger than the first hole, and
the first communication pipe is expanded at a portion thereof that abuts the first hole.

19. The differential pressure sensor assembly according to the sixteenth embodiment, wherein a second through-hole, formed in the second communication pipe, is larger than the second hole, and the second communication pipe is expanded at a portion thereof that abuts the second hole.

20. The differential pressure sensor assembly according to the sixteenth embodiment, wherein the location unit is disposed so as to be biased to a left in the space.

21. The differential pressure sensor assembly according to the sixteenth embodiment, wherein a distance between the location unit and the left side wall is smaller than a distance between the location unit and the right side wall.

22. The differential pressure sensor assembly according to the sixteenth embodiment, wherein the location surface is disposed so as to be perpendicular to the bottom surface.

23. The differential pressure sensor assembly according to the first embodiment, wherein the first communication pipe or the second communication pipe has a hollow shape.

24. The differential pressure sensor assembly according to the first embodiment, wherein the first communication pipe is provided at an outer circumferential surface thereof with a catching protrusion.

25. The differential pressure sensor assembly according to the twenty-fourth embodiment, wherein the catching protrusion is tapered such that a section thereof gradually decreases downwards.

26. A refrigerator comprising: a cabinet having a storage compartment defined therein;

a door for opening and closing the storage compartment;

a case having therein an inlet, through which air is introduced from the storage compartment, and an outlet, through which air is discharged to the storage compartment;

an evaporator provided in the case for exchanging heat with air to supply cool air; and a differential pressure sensor assembly provided in the case, wherein the differential pressure sensor assembly comprises:

a differential pressure sensor comprising a first port, through which air is introduced, a second port, through which the air, introduced through the first port, is discharged, and a substrate, on which the first port and the second port are installed; and a housing, in which the differential pressure sensor is installed, wherein the housing comprises:

a housing body having a space defined therein, the differential pressure sensor being accommodated in the space;

a first communication pipe provided in the housing body, the first communication pipe communicating with the first port; and a second communication pipe communicating with the second port, and wherein the first communication pipe and the second communication pipe extend above the evaporator, and a tube, which extends below the evaporator, is coupled to the first communication pipe.

27. The refrigerator according to the twenty-sixth embodiment, wherein the first communication pipe and the second communication pipe are not disposed parallel to each other but are disposed so as to be inclined to each other.

28. A differential pressure sensor assembly comprising: a differential pressure sensor comprising a first port, through which air is introduced, a second port, through which the air, introduced through the first port, is discharged, and a substrate, on which the first port and the second port are installed; and a housing, in which the differential pressure sensor is installed, wherein the housing comprises:

a housing body having a space defined therein, the differential pressure sensor being accommodated in the space;

a first communication pipe provided in the housing body, the first communication pipe communicating with the first port; and a second communication pipe communicating with the second port, and wherein the first port is disposed parallel to the first communication pipe, and the first communication pipe and the second communication pipe are not disposed parallel to each other but are disposed so as to be inclined to each other.

29. The differential pressure sensor assembly according to the twenty-eighth embodiment, wherein a location unit comprises:

a location surface disposed in surface contact with the differential pressure sensor; and a first hole and a second hole formed in the location surface, and wherein the first hole communicates with the first communication pipe, and the second hole communicates with the second communication pipe.

30. The differential pressure sensor assembly according to the twenty-ninth embodiment, wherein the location surface is disposed parallel to a bottom surface.

31. The differential pressure sensor assembly according to the thirtieth embodiment, wherein a first through-hole, formed in the first communication pipe, is larger than the first hole, and the first communication pipe is expanded at a portion thereof that abuts the first hole.

32. The differential pressure sensor assembly according to the thirty-first embodiment, wherein the first port is disposed in a center of the first through-hole when viewed from above, and the first port is disposed parallel to a direction in which the first communication pipe extends.

The invention claimed is:
1. A refrigerator comprising:
a cabinet that defines a storage compartment;
a door configured to open and close at least a portion of the storage compartment;
a case having a surface that defines an inlet configured to receive air from the storage compartment and an outlet configured to discharge air to the storage compartment, the outlet being located vertically above the inlet;
a fan located at the surface of the case and configured to generate air flow in a direction vertically upward from the inlet to the outlet along the surface of the case;
an evaporator that is located at the case, that is configured to exchange heat with air, and that is configured to supply cool air to the storage compartment, the evaporator being located vertically above the inlet and vertically below the outlet; and
a differential pressure sensor located at the case, the differential pressure sensor comprising:

a first pipe that defines a first through-hole at a lower end of the first pipe between the evaporator and the inlet, the first through-hole being oriented down toward the inlet, a second pipe that defines a second through-hole at a lower end of the second pipe between the evaporator and the outlet, the second through-hole being located vertically above the first through-hole and oriented down toward the evaporator, and a connection member that is located vertically above the evaporator and connects upper ends of the first pipe and the second pipe to each other, wherein the differential pressure sensor is configured to sense a difference in air pressure between the first through-hole and the second through-hole.

2. The refrigerator according to claim 1, wherein the connection member comprises an electronic circuit configured to determine the difference in air pressure between the first through-hole and the second through-hole.

3. The refrigerator according to claim 2, wherein the connection member is located vertically above the evaporator.

4. The refrigerator according to claim 1, wherein the first pipe and the second pipe extend vertically above the evaporator.

5. The refrigerator according to claim 1, wherein the first pipe or the second pipe has a hollow shape that has a circular cross section.

6. The refrigerator according to claim 1, wherein the connection member is located vertically above the fan.

7. The refrigerator according to claim 1, wherein the first pipe defines a plurality of communication holes that are oriented perpendicular to the first through-hole, or the second pipe defines a plurality of communication holes that are oriented perpendicular to the second through-hole.

8. The refrigerator according to claim 1, wherein the first pipe or the second pipe comprises a first expansion part that extends from an end of a corresponding pipe of the first pipe or the second pipe, and wherein a diameter of the first expansion part increases toward a lower end of the first expansion part.

9. The refrigerator according to claim 8, wherein a lower part of the first expansion part defines the first through-hole or the second through-hole at a side surface of the corresponding pipe of the first pipe or the second pipe.

10. The refrigerator according to claim 9, wherein the first expansion part comprises a second expansion part that extends from a lower part of the first expansion part, and wherein a diameter of the second expansion part increases toward a lower end of the second expansion part.

11. The refrigerator according to claim 10, wherein a lower part of the second expansion part lacks a hole that allows air to move upward from the lower part of the second expansion part.

12. The refrigerator according to claim 11, wherein the second expansion part extends radially outward of the first expansion part, and wherein a sectional area of the lower end of the second expansion part is greater than a sectional area of the lower end of the first expansion part.

13. The refrigerator according to claim 1, wherein the first pipe or the second pipe comprises a first portion that is coupled to the connection member and a second portion that defines the first through-hole or the second through-hole, and wherein a sectional area of the first portion is less than a sectional area of the second portion.

14. The refrigerator according to claim 1, further comprising:

a heater located at the case; and a controller configured to control driving of the heater to defrost the evaporator based on the difference in air pressure sensed by the differential pressure sensor.

15. The refrigerator according to claim 14, further comprising a door switch configured to sense whether the door is opened or closed, wherein the controller is further configured to, based on the door switch sensing that the door is closed, control the differential pressure sensor to sense the difference in air pressure.

16. The refrigerator according to claim 14, wherein the controller is further configured to, based on the fan being driven, control the differential pressure sensor to sense the difference in air pressure.

17. The refrigerator according to claim 14, further comprising an evaporator temperature sensor configured to measure a temperature of the evaporator, wherein the controller is further configured to:

drive the heater to defrost the evaporator, and stop driving of the heater in response to the measured temperature of the evaporator being increased to a set temperature.

18. The refrigerator according to claim 1, further comprising a cover that closes a lower part of the first pipe or the second pipe and that is configured to restrict entry of water to the differential pressure sensor.

19. The refrigerator according to claim 1, wherein the case is disposed rearward relative to the storage compartment.

20. The refrigerator according to claim 1, wherein the connection member is attached to the surface of the case.

* * * * *